United States Patent
Koyama et al.

(10) Patent No.: US 11,528,202 B2
(45) Date of Patent: Dec. 13, 2022

(54) PACKET FLOW MONITORING DEVICE, PACKET DATA EXTRACTION DEVICE, EXTRACTION DATA AGGREGATION DEVICE, AND PROGRAM

(71) Applicant: INTELLIGENT WAVE INC., Tokyo (JP)

(72) Inventors: Tomofumi Koyama, Tokyo (JP); Masahiro Kawaragi, Tokyo (JP); Takuya Kurakake, Tokyo (JP); Masaki Tsuji, Tokyo (JP); Ryo Hasegawa, Tokyo (JP); Keiichiro Katsuta, Tokyo (JP); Naoya Suzuki, Tokyo (JP)

(73) Assignee: INTELLIGENT WAVE INC, Tokyo (JP)

( * ) Notice: Subject to any disclaimer, the term of this patent is extended or adjusted under 35 U.S.C. 154(b) by 25 days.

(21) Appl. No.: 17/280,974

(22) PCT Filed: Oct. 24, 2019

(86) PCT No.: PCT/JP2019/041643
§ 371 (c)(1),
(2) Date: Mar. 29, 2021

(87) PCT Pub. No.: WO2020/095692
PCT Pub. Date: May 14, 2020

(65) Prior Publication Data
US 2021/0359923 A1    Nov. 18, 2021

(30) Foreign Application Priority Data
Nov. 9, 2018   (JP) ............................ JP2018-211191
Oct. 2, 2019   (JP) ............................ JP2019-181879

(51) Int. Cl.
*H04L 43/062*     (2022.01)
*H04L 43/067*     (2022.01)
(Continued)

(52) U.S. Cl.
CPC .......... *H04L 43/062* (2013.01); *H04L 43/067* (2013.01); *H04L 43/0882* (2013.01);
(Continued)

(58) Field of Classification Search
CPC . H04L 43/062; H04L 43/067; H04L 43/0882; H04L 43/0888; H04L 69/22; H04L 2101/622
See application file for complete search history.

(56) References Cited

U.S. PATENT DOCUMENTS

| 9,569,232 | B1 * | 2/2017 | Brandwine | ......... H04L 47/2441 |
| 2004/0073655 | A1 * | 4/2004 | Kan | .................... H04L 41/5009 709/224 |

(Continued)

FOREIGN PATENT DOCUMENTS

| JP | 2010-11382 A | 1/2010 |
| JP | 2017-146886 A | 8/2017 |

(Continued)

OTHER PUBLICATIONS

Dec. 3, 2019 International Search Report issued in International Patent Application No. PCT/JP2019/041643.
(Continued)

*Primary Examiner* — Jonathan A Bui
*Assistant Examiner* — Zonghua Da
(74) *Attorney, Agent, or Firm* — Oliff PLC

(57) ABSTRACT

A packet flow monitoring device, a packet data extraction device, an extraction data aggregation device, and a program for efficiently and highly accurately monitoring a packet flow in a video or audio communication system constructed
(Continued)

by an Ethernet (registered trademark) frame or IP packet network. This packet flow monitoring device includes: a packet data extraction device that replicates all passing packets that pass through one or a plurality of specific network switches on the network and extracts and aggregates some predetermined pieces of information in the replicated passing packets to form and output an extraction data report packet; and an extraction data aggregation device that receives the extraction data report packet, analyzes the extraction data report packet so as to aggregate the predetermined pieces of information in the replicated passing packets included in the extraction data report packet for each packet flow, and records the aggregated information as aggregation data.

7 Claims, 23 Drawing Sheets

(51) Int. Cl.
*H04L 43/0882* (2022.01)
*H04L 43/0888* (2022.01)
*H04L 69/22* (2022.01)
*H04L 101/622* (2022.01)

(52) U.S. Cl.
CPC .......... *H04L 43/0888* (2013.01); *H04L 69/22* (2013.01); *H04L 2101/622* (2022.05)

(56) References Cited

U.S. PATENT DOCUMENTS

| | | | | | |
|---|---|---|---|---|---|
| 2004/0083299 | A1* | 4/2004 | Dietz | ................... | H04L 43/026 709/230 |
| 2005/0223089 | A1* | 10/2005 | Rhodes | ............... | H04L 43/0876 707/999.102 |
| 2011/0249572 | A1* | 10/2011 | Singhal | ............... | H04L 43/0876 370/252 |
| 2013/0347103 | A1* | 12/2013 | Veteikis | .................. | H04L 43/04 726/22 |
| 2015/0172143 | A1* | 6/2015 | Degioanni | .......... | H04L 67/1097 370/252 |
| 2015/0341812 | A1 | 11/2015 | Dion et al. | | |
| 2016/0020968 | A1* | 1/2016 | Aumann | ............... | H04L 43/067 370/252 |
| 2016/0359740 | A1* | 12/2016 | Parandehgheibi | ...... | H04L 1/242 |
| 2017/0374090 | A1* | 12/2017 | McGrew | ................. | H04L 41/16 |
| 2018/0287907 | A1* | 10/2018 | Kulshreshtha | ...... | H04L 41/0681 |
| 2019/0230198 | A1* | 7/2019 | Kurakami | ........... | H04L 63/1425 |

FOREIGN PATENT DOCUMENTS

| | | |
|---|---|---|
| JP | 2018-107584 A | 7/2018 |
| WO | 2009/032925 A1 | 3/2009 |

OTHER PUBLICATIONS

Dec. 3, 2019 Written Opinion issued in International Patent Application No. PCT/JP2019/041643.
SMPTE ST 292-1, "1 5 GB/S Signal/Data Serial Interface", [online], IEEE Xplore Digital Library, [Retrieved on Oct. 22, 2018], Internet <https://ieeexplore.ieee.org/document/7291770>.
AES Oct. 2008, "AES Recommended Practice for Digital Audio Engineering-Serial Multichannel Audio Digital Interface (MADI)", [online], Audio Engineering Society, [Retrieved on Oct. 22, 2018], Internet <Http://www.aes.org/publications/standards/search.cfm?docID=17>.
BBC Research & Development White Paper 268, "The IP Studio", [online], BBC Research & Development, [Retrieved on Oct. 22, 2018], Internet <https://www.bbc.co.uk/rd/publications/whitepaper268>.
RFC 3176, "A Method for Monitoring Traffic in Switched and Routed Networks", [online], Network Working Group (Category Informational), InMon Corporation, [Retrieved on Oct. 22, 2018], Internet <https://tools.ietf.org/html/rfc3176>.
SMPTE ST 2110-20, "Uncompressed Active Video", [online], IEEE Xplore Digital Library, [Retrieved on Oct. 22, 2018], Internet <https://ieeexplore.ieee.org/document/8167389>.
SMPTE ST 2110-30, "PCM Digital Audio", [online], IEEE Xplore Digital Library, [Retrieved on Oct. 22, 2018], Internet <https://ieeexplore.ieee.org/document/8167392>.
SMPTE ST 2022-6, "Transport of High Bit Rate Media Signals over IP Networks", [online], IEEE Xplore Digital Library, [Retrieved on Oct. 22, 2018], Internet <https://ieeexplore.ieee.org/document/7289943>.
Masayuki Yamai "The Latest Technology That Heats Companies". Nikkei Communications, Oct. 1, 2007, No. 495, pp. 107-113.
Jun. 29, 2022 Search Report issued in European Patent Application No. 19882308.0.
Guyue Liu et al.: "NetAlytics", Nov. 28, 2016; 1077952576-1077952576, Nov. 28, 2016 (Nov. 28, 2016), pp. 1-14, XP058306677, DOI: 10.1145/2988336.2988344 ISBN: 978-1-4503-4300-8.

* cited by examiner

FIG. 2

(a) EXTRACTION DATA COMMON HEADER

| bit 1 | 9 | 17 | 25 | 32 |
|---|---|---|---|---|
| | DEVICE ID | | TIMESTAMP VALUE (SECONDS) SYNCHRONIZED WITH PTP DURING RECEPTION OF BEGINNING DATA | |
| TIMESTAMP VALUE (SECONDS) SYNCHRONIZED WITH PTP DURING RECEPTION OF BEGINNING DATA | | | | |
| TIMESTAMP VALUE (NANOSECONDS) SYNCHRONIZED WITH PTP DURING RECEPTION OF BEGINNING DATA | | | | |

(b) EXTRACTION DATA INDIVIDUAL HEADER

| bit 1 | 9 | 17 | 25 | 32 |
|---|---|---|---|---|
| R | PASSING PACKET LENGTH | | DATA TYPE | RECEPTION PORT ID |
| R | ELAPSED TIME (NANOSECONDS) UNTIL TIMESTAMP VALUE OF RECEIVED PTP OF BEGINNING DATA FROM TIMESTAMP VALUE SYNCHRONIZED WITH PTP DURING RECEPTION OF BEGINNING DATA | | | |

R: RESERVE (1 BIT; 0 OR 1)

FIG. 10

[EXTRACTION DATA FOR PTP]

| bit 1 | 9 | 17 | 25 | 32 |
|---|---|---|---|---|
| DESTINATION MAC ADDRESS ||||
| DESTINATION MAC ADDRESS || SOURCE MAC ADDRESS ||
| SOURCE MAC ADDRESS ||||
| SOURCE IP ADDRESS ||||
| DESTINATION IP ADDRESS ||||
| SOURCE L4-PORT NUMBER || DESTINATION L4-PORT NUMBER ||
| DIFFERENCE BETWEEN PASSING PACKET LENGTH AND (PTP HEADER + PAYLOAD LENGTH) | PTP HEADER + PAYLOAD |||
| ⋯ ||||
| PTP HEADER + PAYLOAD ||||

FIG. 13

[AGGREGATION DATA LIST]

[E-FRAME AGGREGATION DATA]
- SOURCE MAC ADDRESS
- DESTINATION MAC ADDRESS
- E-FRAME TYPE NUMBER
- AVERAGE THROUGHPUT
- TOTAL NUMBER OF RECEIVED PACKETS

[IP AGGREGATION DATA]
- SOURCE MAC ADDRESS
- DESTINATION MAC ADDRESS
- SOURCE IP ADDRESS
- DESTINATION IP ADDRESS
- IP HEADER PROTOCOL NUMBER
- AVERAGE THROUGHPUT
- TOTAL NUMBER OF RECEIVED PACKETS

[IGMP AGGREGATION DATA]
- SOURCE MAC ADDRESS
- DESTINATION MAC ADDRESS
- SOURCE IP ADDRESS
- DESTINATION IP ADDRESS
- AVERAGE THROUGHPUT
- TOTAL NUMBER OF RECEIVED PACKETS
- RECEPTION TIME
- IGMP PAYLOAD

[TCP/UDP AGGREGATION DATA]
- SOURCE MAC ADDRESS
- DESTINATION MAC ADDRESS
- SOURCE IP ADDRESS
- DESTINATION IP ADDRESS
- SOURCE L4-PORT NUMBER
- DESTINATION L4-PORT NUMBER
- AVERAGE THROUGHPUT
- TOTAL NUMBER OF RECEIVED PACKETS

[PTP AGGREGATION DATA]
- SOURCE MAC ADDRESS
- DESTINATION MAC ADDRESS
- SOURCE IP ADDRESS
- DESTINATION IP ADDRESS
- SOURCE L4-PORT NUMBER
- DESTINATION L4-PORT NUMBER
- AVERAGE THROUGHPUT
- TOTAL NUMBER OF RECEIVED PACKETS
- TRANSMISSION DELAY (AVERAGE/MINIMUM/MAXIMUM)
- RECEPTION TIME
- PTP HEADER + PAYLOAD

[RTP AGGREGATION DATA]
- SOURCE MAC ADDRESS
- DESTINATION MAC ADDRESS
- SOURCE IP ADDRESS
- DESTINATION IP ADDRESS
- SOURCE L4-PORT NUMBER
- DESTINATION L4-PORT NUMBER
- AVERAGE THROUGHPUT
- TOTAL NUMBER OF RECEIVED PACKETS
- RTP PAYLOAD TYPE
- RTP SSRC
- NUMBER OF PACKETS WITH RTP MARKER VALUE INDICATING 1
- PACKET RECEPTION INTERVAL (AVERAGE/MINIMUM/MAXIMUM)
- NUMBER OF PACKET LOSSES
- MAXIMUM NUMBER OF BURST LOSSES

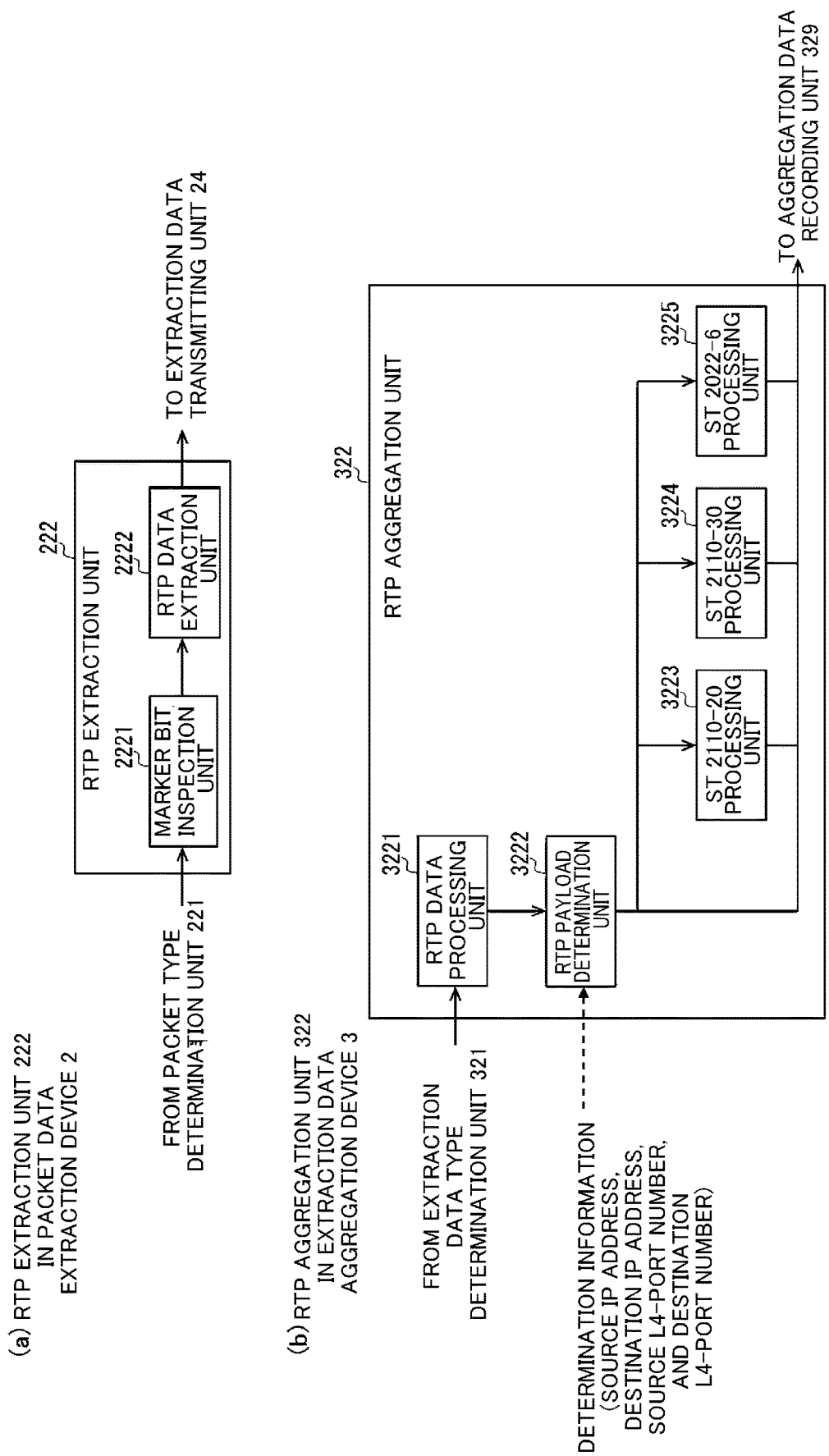

FIG. 17

[RTP AGGREGATION DATA]
- SOURCE MAC ADDRESS
- DESTINATION MAC ADDRESS
- SOURCE IP ADDRESS
- DESTINATION IP ADDRESS
- SOURCE L4-PORT NUMBER
- DESTINATION L4-PORT NUMBER
- AVERAGE THROUGHPUT
- TOTAL NUMBER OF RECEIVED PACKETS
- RTP PAYLOAD TYPE
- RTP SSRC
- NUMBER OF PACKETS WITH RTP MARKER VALUE INDICATING 1
- PACKET RECEPTION INTERVAL (AVERAGE/MINIMUM/MAXIMUM)
- NUMBER OF PACKET LOSSES
- MAXIMUM NUMBER OF BURST LOSSES (ST 2110-20)
- DATA OUTPUT BY RTP
- RESOLUTION
- FRAME RATE
- INTERLACED/PROGRESSIVE
- TRANSMISSION DELAY (AVERAGE/MINIMUM/MAXIMUM)

(ST 2110-30)
- DATA OUTPUT BY RTP
- SAMPLING FREQUENCY
- PACKET TIME
- PAYLOAD LENGTH
- TRANSMISSION DELAY (AVERAGE/MINIMUM/MAXIMUM)

(ST 2022-6)
- DATA OUTPUT BY RTP
- MAP VALUE IN ST 2022-6
- FRAME VALUE IN ST 2022-6
- FRATE VALUE IN ST 2022-6
- SAMPLE VALUE IN ST 2022-6
- R-VALUE IN ST 2022-6

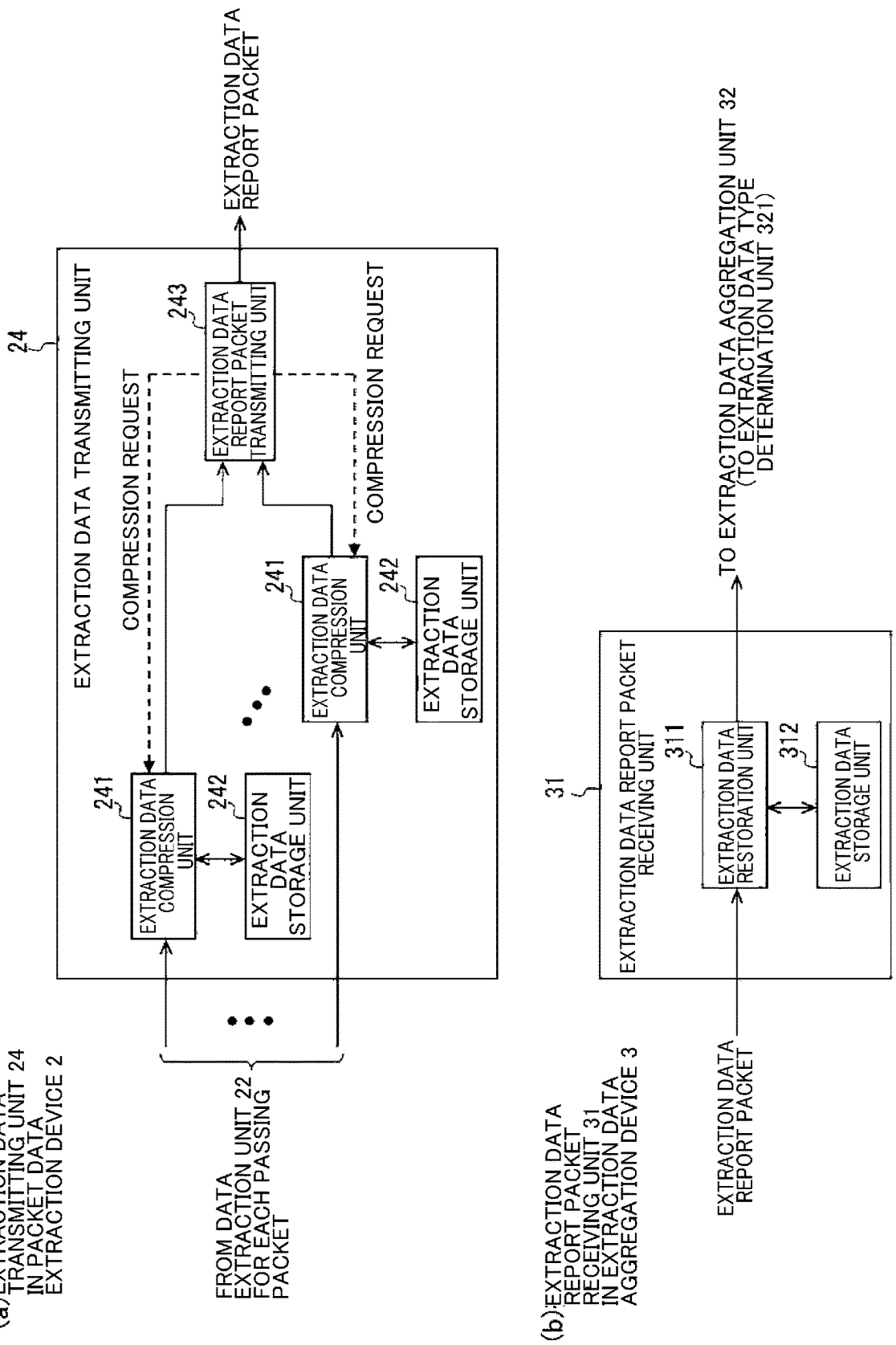

FIG. 19

[PACKET-BASED EXTRACTION DATA FOR RTP]

| bit 1 | | 9 | 17 | 25 | 32 | |
|---|---|---|---|---|---|---|
| R | | PASSING PACKET LENGTH | DATA TYPE | RECEPTION PORT ID | | EXTRACTION DATA INDIVIDUAL HEADER |
| C | R | ELAPSED TIME (NANOSECONDS) UNTIL TIMESTAMP VALUE OF RECEIVED PTP OF DATA FROM TIMESTAMP VALUE OF RECEIVED PTP OF BEGINNING DATA | | | | EXTRACTION DATA FOR RTP |
| DM | SM | SI | DI | SP | DP | TS | SS | DESTINATION MAC ADDRESS | | |
| DESTINATION MAC ADDRESS | | | | SOURCE MAC ADDRESS | | |
| SOURCE MAC ADDRESS | | | | | | |
| SOURCE IP ADDRESS | | | | | | |
| DESTINATION IP ADDRESS | | | | | | |
| DESTINATION L4-PORT NUMBER | | DIFFERENCE BETWEEN PASSING PACKET LENGTH AND RTP PAYLOAD LENGTH | SOURCE L4-PORT NUMBER | | | |
| | | | M | PT | RTP SEQUENCE NUMBER | |
| RTP SEQUENCE NUMBER | | | RTP TIMESTAMP VALUE | | | |
| RTP TIMESTAMP VALUE | | | SSRC | | | |
| SSRC | | | RTP PAYLOAD | | | |
| | | | RTP PAYLOAD | | | |
| ... | | | | | | |
| | | | RTP PAYLOAD | | | |
| RTP PAYLOAD | | | | | | |

C: DATA COMPRESSION PRESENCE/ABSENCE FLAG (1 BIT; 1 WHEN DATA COMPRESSION IS PERFORMED IN EXTRACTION DATA, 0 WHEN NOT PERFORMED)
DM: DATA COMPRESSION POSITION FLAG RELATED TO DESTINATION MAC ADDRESS (1 BIT; 1 WHEN DATA IS OMITTED, 0 WHEN NOT OMITTED)
SM: DATA COMPRESSION POSITION FLAG RELATED TO SOURCE MAC ADDRESS (1 BIT; 1 WHEN DATA IS OMITTED, 0 WHEN NOT OMITTED)
SI: DATA COMPRESSION POSITION FLAG RELATED TO SOURCE IP ADDRESS (1 BIT; 1 WHEN DATA IS OMITTED, 0 WHEN NOT OMITTED)
DI: DATA COMPRESSION POSITION FLAG RELATED TO DESTINATION IP ADDRESS (1 BIT; 1 WHEN DATA IS OMITTED, 0 WHEN NOT OMITTED)
SP: DATA COMPRESSION POSITION FLAG RELATED TO SOURCE L4-PORT NUMBER (1 BIT; 1 WHEN DATA IS OMITTED, 0 WHEN NOT OMITTED)
DP: DATA COMPRESSION POSITION FLAG RELATED TO DT L4-PORT NUMBER (1 BIT; 1 WHEN DATA IS OMITTED, 0 WHEN NOT OMITTED)
TS: DATA COMPRESSION POSITION FLAG RELATED TO RTP TIMESTAMP VALUE (1 BIT; 1 WHEN DATA IS OMITTED, 0 WHEN NOT OMITTED)
SS: DATA COMPRESSION POSITION FLAG RELATED TO SSRC (1 BIT; 1 WHEN DATA IS OMITTED, 0 WHEN NOT OMITTED)

FIG. 23
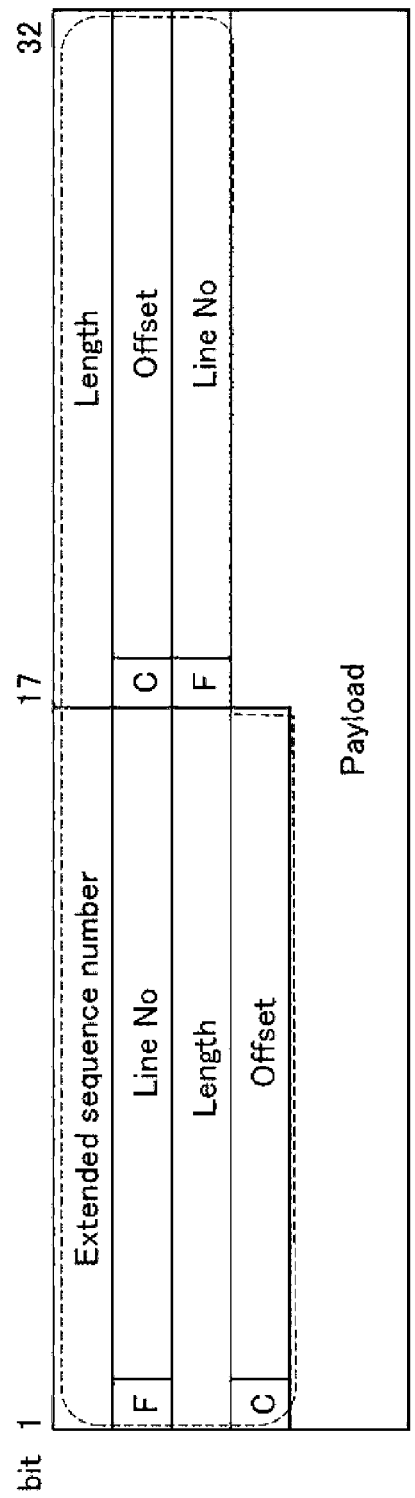
(a) SMPTE ST2110-20 (WITHIN BROKEN LINES: HEADER INFORMATION)
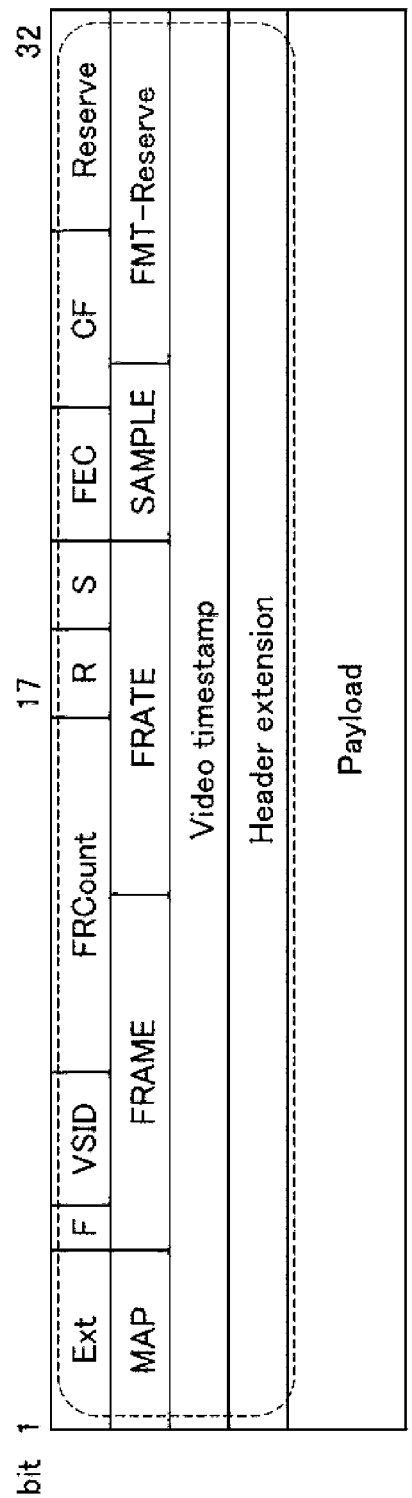
(b) SMPTE ST2022-6 (WITHIN BROKEN LINES: HEADER INFORMATION)

PACKET FLOW MONITORING DEVICE, PACKET DATA EXTRACTION DEVICE, EXTRACTION DATA AGGREGATION DEVICE, AND PROGRAM

FIELD OF THE INVENTION

The present invention relates to a packet flow monitoring device, a packet data extraction device, an extraction data aggregation device, and a program for monitoring the quality of the flow of packets (packet flow) when storing video, audio, and synchronization information constructed by an Ethernet (registered trademark)/IP (Internet Protocol) network in packets and transmitting the packets.

DESCRIPTION OF RELATED ART

Conventionally, a program production system that transmits video, audio, and synchronization information has been configured according to a signal transmission method using SDI (for example, see Non-Patent Literature 1) or MADI (for example, see Non-Patent Literature 2) developed for program production. A typical example of a program production system in the SDI and MADI signal format can be configured as illustrated in FIG. 20, for example. A video transmitting device 510 that transmits the video of a photographing camera or the like transmits the video to an SDI router 600 as an SDI-format signal (SDI signal), and distributes and transmits the video from the SDI router 600 to a designated receiving device 800 such as a receiver. Further, an audio transmitting device 520 that transmits audio of a microphone or the like transmits the audio to the SDI router 600 via an audio router 700 as a MADI-format signal (MADI signal), and distributes and transmits the audio from the SDI router 600 to a designated receiving device 800. The video transmitting device 510, the audio transmitting device 520, the SDI router 600, the audio router 700, and the receiving device 800 can be synchronized by a synchronization signal from a synchronization signal generator 900.

On the other hand, in recent years, it has been studied to construct a program production system for storing video, audio, and synchronization information in Ethernet (registered trademark) frames (hereinafter, also referred to as "E-frames" in the present specification) and IP packets (in the present specification, E-frames and IP packets are collectively referred to as "packets") and transmitting the same (see, for example, Non-Patent Literature 3). A typical example of a program production system constructed by an E-frame or IP packet network can be configured as illustrated in FIG. 21, for example. A video transmitting device 51 that transmits the video of a photographing camera or the like stores the video in an E-frame or an IP packet, transmits the packet to a certain network switch 60, and transmits the packet from the network switch 60 via another network switch 60 or directly to a designated receiving device 80 such as a receiver on the basis of the header information in the packet. Further, an audio transmitting device 52 that transmits audio of a microphone or the like stores the audio in an E-frame or an IP packet, transmits the packet to a certain network switch 60, and transmits the packet from the network switch 60 via another network switch 60 or directly to a designated receiving device 80 on the basis of the header information in the packet.

One network switch 60 is connected to another network switch 60 and transmitting devices such as the video transmitting device 51 and the audio transmitting device 52 by a communication cable such as a LAN (Local Area Network) cable and has input ports for receiving packets from the other network switch 60 and a plurality of these transmitting devices. Further, one network switch 60 is connected to another network switch 60 and one or a plurality of receiving devices 80 by a communication cable, and has output ports for relaying and outputting packets transmitted to the other network switch 60 and one or a plurality of receiving devices 80.

In a program production system constructed by an E-frame or IP packet network, network switches 60 are synchronized by a synchronization signal from a synchronization signal generator 90 so as to be able to cope with a case where video, audio, and synchronization information are transmitted in real-time. Although not illustrated, the synchronization signal is also transmitted to the video transmitting device 51 and the receiving device 80 via the network switch 60 so that all devices are synchronized.

In a program production system constructed by an E-frame or IP packet network, since the network switch 60 and the devices can be configured at a relatively low cost, and the transmission capacity of the network can be increased, it is expected to reduce equipment costs. In addition, since a general-purpose PC (Personal Computer) server can be configured to receive and process data via the network, it is expected to support communication service such as on-demand and realize advanced processing such as monitoring the flow of packets (packet flow) on the program production system.

As a technique of monitoring a packet flow on a general communication system, a monitoring server capable of acquiring quality information such as the number of output packets, the number of packets output or discarded from a network switch arranged in an IP network and the average bit rate at intervals of several minutes may be provided in each interface of the network switch arranged in the IP network. Further, as a technique of monitoring a packet flow on a general communication system, a monitoring system called sFlow is known (see, for example, Non-Patent Literature 4). In sFlow, the amount of traffic in each packet flow can be estimated by sampling packets processed in the switch, inspecting the content of only some packets, and statistically processing the result.

A network switch in a general communication system usually has a function of replicating a packet to be transmitted. Therefore, in a general communication system, as illustrated in FIG. 22, a dedicated analysis device that extracts the replicated packet from each network switch (the same reference numeral is assigned since the network switch 60 in the program production system illustrated in FIG. 21 can be similarly configured) and analyzing the packet flow may be provided. For example, a configuration may be adopted in which packets replicated in a plurality of network switches 60 are transmitted to the analysis device 200, and the packets are analyzed so as to monitor each packet flow. In the case of collecting and analyzing replicated packets using such a packet replication function in the network switch, a plurality of communication cables connected to each of the replicate data transmission ports as many as the number of ports used for data transmission are used.

In general, the SMPTE ST 2110-20 standard is defined when storing video signal data in packets and transmitting the same on an IP network (see, for example, Non-Patent Literature 5), and the SMPTE ST 2110-30 standard is defined when storing audio signal data in packets and transmitting the same on an IP network (see, for example, Non-Patent Literature 6). Further, the SMPTE ST 2022-6 standard is defined when storing video and audio information in packets and transmitting the same (see, for example, Non-Patent Literature 7). As a representative example, FIG. 23(a) illustrates the signal format of the SMPTE ST 2110-20 standard, and FIG. 23(b) illustrates the signal format of the SMPTE ST 2022-6 standard, both of which are defined such that the designated header information and the payload that stores data are arranged in a designated number of bits.

CITATION LIST

Non-Patent Literature 1: SMPTE ST 292-1, "1.5 Gb/S Signal/Data Serial Interface", [online], IEEE Xplore Digital Library, [Retrieved on Oct. 22, 2018], Internet <https://ieeexplore.ieee.org/document/7291770>

Non-Patent Literature 2: AES 10-2008, "AES Recommended Practice for Digital Audio Engineering-Serial Multichannel Audio Digital Interface (MADI)", [online], Audio Engineering Society, [Retrieved on Oct. 22, 2018], Internet <Http://www.aes.org/publications/standards/search.cfm?docID=17>

Non-Patent Literature 3: BBC Research & Development White Paper 268, "The IP Studio", [online], BBC Research & Development, [Retrieved on Oct. 22, 2018], Internet <https://www.bbc.co.uk/rd/publications/whitepaper268>

Non-Patent Literature 4: RFC 3176, "A Method for Monitoring Traffic in Switched and Routed Networks", [online], Network Working Group (Category Informational), InMon Corporation, [Retrieved on Oct. 22, 2018], Internet <https://tools.ietf.org/html/rfc3176>

Non-Patent Literature 5: SMPTE ST 2110-20, "Uncompressed Active Video", [online], IEEE Xplore Digital Library, [Retrieved on Oct. 22, 2018], Internet <https://ieeexplore.ieee.org/document/8167389>

Non-Patent Literature 6: SMPTE ST 2110-30, "PCM Digital Audio", [online], IEEE Xplore Digital Library, [Retrieved on Oct. 22, 2018], Internet <https://ieeexplore.ieee.org/document/8167392>

Non-Patent Literature 7: SMPTE ST 2022-6, "Transport of High Bit Rate Media Signals over IP Networks", [online], IEEE Xplore Digital Library, [Retrieved on Oct. 22, 2018], Internet <https://ieeexplore.ieee.org/document/7289943>

SUMMARY OF THE INVENTION

When a failure occurs in a certain video signal during the operation of a program production system, it is necessary to perform quality measurement to confirm the state of the video signal. In a program production system of the SDI and MADI signal format, it is clear through which cable the video signal is transmitted, and a technique of measuring the quality of the video signal is established.

On the other hand, in a program production system constructed by an E-frame or IP packet network, packets are multiplexed by a network switch in the network, and the packet transmission path is autonomously determined by each network switch. Therefore, it is difficult to know through which LAN cable, the quality measurement target video signal is flowing, and it is also necessary to separate the video signal from other video signals and audio signals.

For example, as described above, as a technique of monitoring a packet flow on a general communication system, a monitoring server capable of acquiring quality information such as the number of output packets, the number of discarded packets, and the average bit rate at intervals of several minutes may be provided in each interface of the network switch arranged in an IP network. However, even if such a monitoring server is applied to the program production system illustrated in FIG. 22, the value indicating the quality information acquired by the monitoring server is the total value of all packets in which packets storing the video signal and the audio signal are multiplexed, and there is a problem that it is impossible to know the quality of the measurement target video signal.

Further, on the basis of the sFlow technique disclosed in Non-Patent Literature 4, the amount of traffic for each IP flow may be estimated by sampling the packets processed in the network switch to inspect the content of only some packets and statistically processing the inspection result. However, since sFlow does not measure all packets processed in the network switch, there is a problem that it is impossible to grasp the accurate amount of traffic and detect packet loss. In particular, in broadcast program production sites, since packet loss is directly linked to video deterioration, accurate monitoring that does not overlook even one payload or jitter such as checking all packets in real-time to detect packet loss and measuring jitter is required, and a more accurate monitoring technique than the packet flow monitoring performed in the conventional computer system is required. Therefore, even if sFlow is applied to the program production system, it is impossible to detect packet loss and measure jitter, which makes quality control difficult. In addition, monitoring all packets on the network switch increases the load as the speed of the network increases, which may adversely affect the original processing of the network switch.

Further, as described above, when the communication packet flow monitoring device 100 as illustrated in FIG. 22 is configured using the packet replication function in the network switch, a plurality of communication cables to be connected to the replication data transmission ports as many as the number of ports used for data transmission is required. That is, in this form, since all packets processed by the network switch are monitored, a number of ports the same as normal data transmission are required, which is not practical.

In view of the above problems, an object of the present invention is to provide a packet flow monitoring device, a packet data extraction device, an extraction data aggregation device, and a program for efficiently and highly accurately monitoring packet flow in a video or audio computer system constructed by an Ethernet (registered trademark) frame or IP packet network.

A packet flow monitoring device of the present invention is a packet flow monitoring device that monitors packet flow in a video or audio communication system constructed by an Ethernet (registered trademark) or IP (Internet Protocol) packet network, including: a packet data extraction device that replicates all passing packets that pass through one or a plurality of specific network switches on the network and extracts and aggregates some predetermined pieces of information in the replicated passing packets to form and output an extraction data report packet; and an extraction data aggregation device that receives the extraction data report packet, analyzes the extraction data report packet so as to aggregate the some predetermined pieces of information in the replicated passing packets included in the extraction data report packet for each packet flow, and records the aggregated information as aggregation data.

In the packet flow monitoring device of the present invention, the packet data extraction device and the extraction data aggregation device are connected by a communication cable using a single port.

In the packet flow monitoring device of the present invention, the extraction data report packet is composed of IP-format packets having a variable length within a range not exceeding a predetermined packet length, an IP header and a UDP header for performing transmission between the packet data extraction device and the extraction data aggregation device, an extraction data common header composed of items common to the aggregated, replicated passing packets, and packet-based extraction data composed of items individually extracted for the replicated passing packets are assigned to the extraction data report packet, and the packet-based extraction data is configured such that an extraction data individual header indicating information for identifying the extracted, replicated passing packets and extraction data that stores the some predetermined pieces of information in the extracted, replicated passing packets are paired with each other.

In the packet flow monitoring device of the present invention, the extraction data common header includes a value indicating a reception time of beginning data of the replicated passing packet in each packet flow, the extraction data individual header includes a passing packet length indicating a length of the replicated passing packet, a data type indicating a packet type of the replicated passing packet, and elapsed time information indicating a temporal difference from the beginning data described in the extraction data common header, and the packet type includes a value that identifies at least Ethernet (registered trademark), IP, and RTP (Real-time Transport Protocol).

In the packet flow monitoring device of the present invention, the packet type further includes a value that identifies IGMP (Internet Group Management Protocol), TCP (Transmission Control Protocol), UDP (User Datagram Protocol), and PTP (Precision Time Protocol).

In the packet flow monitoring device of the present invention, the pieces of information extracted by the packet data extraction device includes: extraction data for Ethernet (registered trademark) including a destination MAC address, a source MAC address, and a type number of an E-frame header, extraction data for IP network including a destination MAC address, a source MAC address, a source IP address, a destination IP address, and a protocol number of an IP header, extraction data for IGMP including a destination MAC address, a source MAC address, a source IP address, a destination IP address, a difference between a passing packet length and an IGMP payload length, and a predetermined amount of an IGMP payload from the beginning, extraction data for TCP or UDP including a destination MAC address, a source MAC address, a source IP address, a destination IP address, a source L4-port number, and a destination L4-port number, extraction data for PTP including a destination MAC address, a source MAC address, a source IP address, a destination IP address, a source L4-port number, a destination L4-port number, a difference between a passing packet length and a PTP header and payload length, and an entire part of a PTP header and PTP payload, and extraction data for RTP including a destination MAC address, a source MAC address, a source IP address, a destination IP address, a source L4-port number, a destination L4-port number, a difference between a passing packet length and a RTP payload length, a marker bit of an RTP header, a payload type of an RTP header, an RTP sequence number, an RTP timestamp value, and an SSRC that is an identifier indicating a source.

In the packet flow monitoring device of the present invention, the extraction data aggregation device analyzes the extraction data common header and the packet-based extraction data in each of the replicated passing packets in the extraction data report packet received sequentially to generate aggregation data for each packet flow according to a packet type, the aggregation data including: aggregation data for Ethernet (registered trademark) including a source MAC address, a destination MAC address, an E-frame type number, an average throughput, and a total number of received packets for each packet flow; aggregation data for IP including a source MAC address, a destination MAC address, a source IP address, a destination IP address, an IP header protocol number, an average throughput, and a total number of received packets for each packet flow; aggregation data for IGMP including a source MAC address, a destination MAC address, a source IP address, a destination IP address, an average throughput, a total number of received packets, a reception time, and a predetermined byte of IGMP payload from the beginning for each packet flow; aggregation data for TCP or UDP including a source MAC address, a destination MAC address, a source IP address, a destination IP address, a source L4-port number, a destination L4-port number, an average throughput, and a total number of received packets for each packet flow; aggregation data for PTP including a source MAC address, a destination MAC address, a source IP address, a destination IP address, a source L4-port number, a destination L4-port number, an average throughput, a total number of received packets, a transmission delay, a reception time, and an entire part of PTP header and payload for each packet flow; and aggregation data for RTP including a source MAC address, a destination MAC address, a source IP address, a destination IP address, a source L4-port number, a destination L4-port number, an average throughput, a total number of received packets, an RTP payload type number, an RTP SSRC, the number of packets with an RTP marker bit value of 1, a packet reception interval, the number of packet losses, and a maximum number of burst losses for each packet flow.

In the packet flow monitoring device of the present invention, the packet data extraction device includes an RTP data extraction unit that determines whether a marker bit in an RTP header is 1 when extracting the pieces of information from the replicated passing packet related to RTP, and extracts the pieces of information so as to include 40 bytes of an RTP payload from the beginning when the marker bit is 1, the extraction data aggregation device includes: an RTP payload determination unit that determines whether each of the replicated passing packets related to RTP complies with an SMPTE protocol of ST 2110-20, ST 2110-30, or ST 2022-6 from the 40 bytes of the RTP payload from the beginning on the basis of predetermined determination information when aggregating, for each packet flow, the pieces of information in each of the replicated passing packets related to RTP included in the extraction data report packet; and a processing unit that acquires predetermined information characterized in ST 2110-20, ST 2110-30, or ST 2022-6 from the 40 bytes of the payload from the beginning and adds the predetermined information to the aggregation data when the replicated passing packet complies with ST 2110-20, ST 2110-30, or ST 2022-6 and the marker bit is 1.

In the packet flow monitoring device of the present invention, the packet data extraction device includes: an extraction data compression unit that compresses extraction data to be stored in the same extraction data report packet received in the same packet flow when extracting the pieces of information from the replicated passing packet to create extraction data; and an extraction data report packet transmitting unit that inserts the compressed data, a data compression presence/absence flag indicating presence/absence of data compression, and a data compression position flag indicating a data position of data compression to generate and output the extraction data report packet, and the extraction data aggregation device includes an extraction data restoration unit that restores the compressed data by referring to the data compression presence/absence flag and the data compression position flag.

Further, a packet data extraction device of the present invention is a packet data extraction device used for monitoring packet flow in a video or audio communication system constructed by an Ethernet (registered trademark) or IP packet network, wherein the packet data extraction device replicates all passing packets passing through one or a plurality of specific network switches on the network, extracts and aggregates some predetermined pieces of information in the replicated passing packets to form an extraction data report packet, and outputs the extraction data report packet to external devices.

Further, an extraction data aggregation device of the present invention is an extraction data aggregation device which receives the extraction data report packet from the packet data extraction device of the present invention to analyze the pieces of information in the replicated passing packets included in the extraction data report packet so as to be aggregated for each packet flow, and records the aggregated information as aggregation data.

Further, a program of the present invention is configured as a program for causing a computer to function as the packet data extraction device in the packet flow monitoring device of the present invention.

Further, a program of the present invention is configured as a program for causing a computer to function as the extraction data aggregation device in the packet flow monitoring device of the present invention.

According to the present invention, it is possible to efficiently and highly accurately monitor packet flow in a video or audio communication system constructed by an Ethernet (registered trademark) frame or IP packet network. Preferably, it is possible to efficiently and highly accurately monitor and measure the quality related to the packet flow in a program production system for transmitting video and the like.

In particular, according to an aspect of the present invention, some predetermined pieces of information (including some pieces of information in the packet header, a part of the payload if the packet type is IGMP, and an entire part of the payload if the packet type is PTP) in the passing packet passing through an E-frame or IP packet network are extracted and aggregated to form the extraction data report packet. Therefore, it is possible to monitor and measure the quality of all packets even for information on traffic flowing through a high-throughput network (for example, signal transmission related to a 4K/8K video system as a packet flow with a high transmission rate).

Further, according to an aspect of the present invention, when the some predetermined pieces of information in the passing packet are extracted, the packet type of the passing packet is determined, and the necessary information can be extracted according to the packet type. Therefore, it is possible to monitor detailed information such as throughput and a packet loss for each packet flow in real-time.

According to an aspect of the present invention, since the information extracted to be embedded in the extraction data report packet is compressed, it is possible to monitor and measure the quality related to more packet flows using one packet flow monitoring device.

BRIEF DESCRIPTION OF THE DRAWINGS

FIGS. 2(a) and 2(b) are diagrams illustrating signal formats of an extraction data common header and an extraction data individual header in an extraction data report packet in the packet flow monitoring device of the first embodiment according to the present invention, respectively.

FIG. 10 is a diagram illustrating a signal format of extraction data for PTP (Precision Time Protocol) in the packet flow monitoring device of the first embodiment according to the present invention.

FIG. 13 is a diagram illustrating an aggregation data list of the extraction data aggregation device in the packet flow monitoring device of the first embodiment according to the present invention.

FIGS. 14(a) and 14(b) are block diagrams illustrating a schematic configuration of an RTP extraction unit of a packet data extraction device and an RTP aggregation unit of an extraction data aggregation device in a packet flow monitoring device of a second embodiment according to the present invention, respectively.

FIG. 17 is a diagram illustrating RTP aggregation data among pieces of aggregation data of the extraction data aggregation unit in the packet flow monitoring device of the second embodiment according to the present invention.

FIGS. 18(a) and 18(b) are block diagrams illustrating a schematic configuration of an extraction data transmitting unit in a packet data extraction device and an extraction data report packet receiving unit in an extraction data aggregation device of a packet flow monitoring device of a third embodiment according to the present invention, respectively.

FIG. 19 is a diagram illustrating a signal format of a RTP packet-based extraction data in the packet flow monitoring device of the third embodiment according to the present invention.

FIGS. 23(a) and 23(b) are diagrams illustrating signal formats of the SMPTE ST 2110-20 standard and the SMPTE ST 2022-6 standard, respectively.

DETAILED DESCRIPTION OF THE INVENTION

Hereinafter, a packet flow monitoring device 1 of each embodiment according to the present invention will be described in detail with reference to the drawings.

First Embodiment (Overall Configuration)

Figure 1:
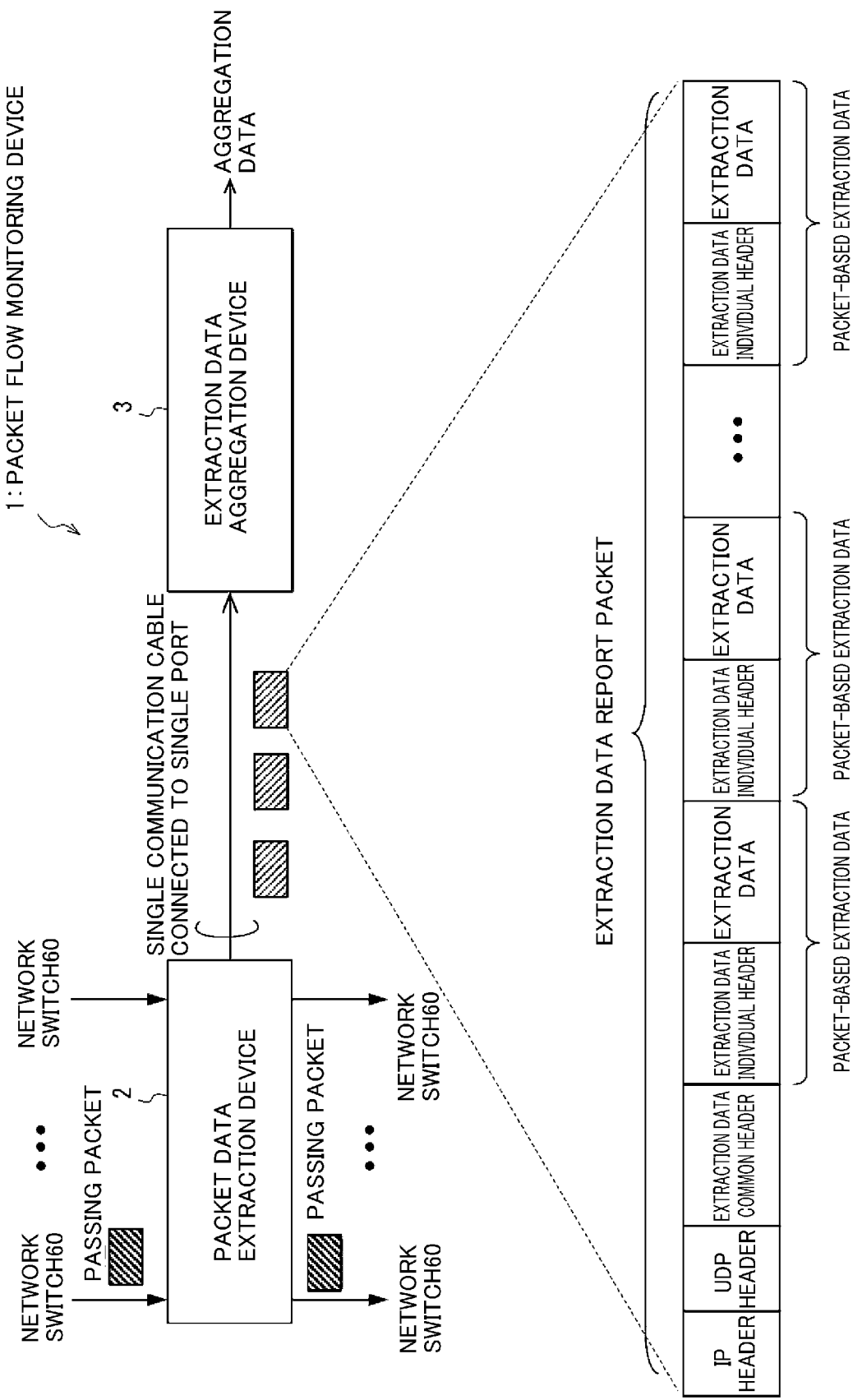
FIG. 1 is a block diagram illustrating a schematic configuration of a packet flow monitoring device according to a first embodiment of the present invention.

FIG. 1 is a block diagram illustrating a schematic configuration of the packet flow monitoring device 1 according to the first embodiment of the present invention. The packet flow monitoring device 1 is a device for monitoring the quality related to packet flow of all passing packets passing through one or a plurality of specific network switches 60 on an E-frame or IP packet network illustrated in FIG. 21 in a program production system constructed by the E-frame or IP packet network to measure predetermined quality information to be described later. The packet flow monitoring device 1 includes a packet data extraction device 2 and an extraction data aggregation device 3.

Figure 21:
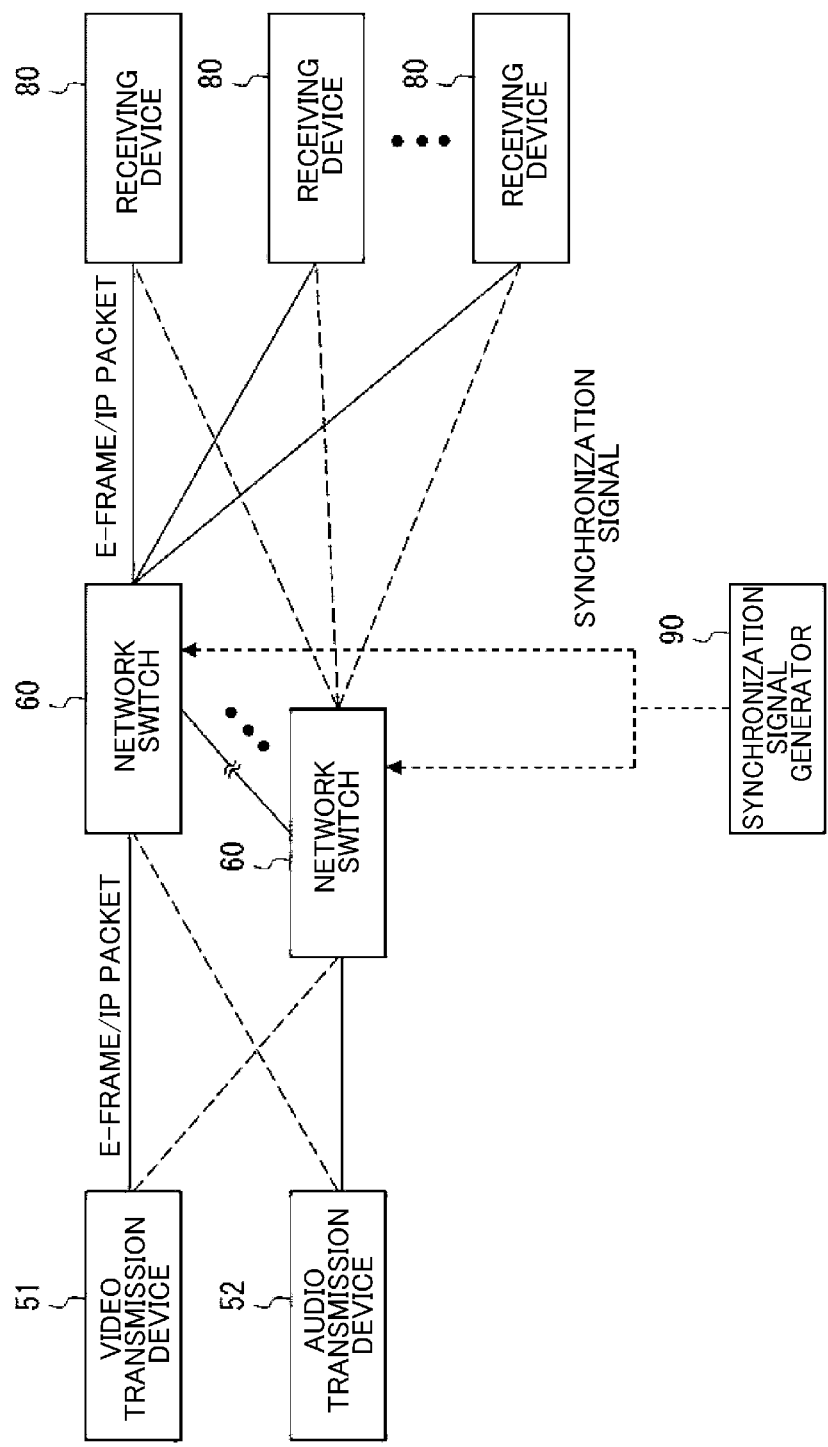
FIG. 21 is a block diagram illustrating a typical example of a program production system constructed by a conventional E-frame or IP packet network.
Figure 22:
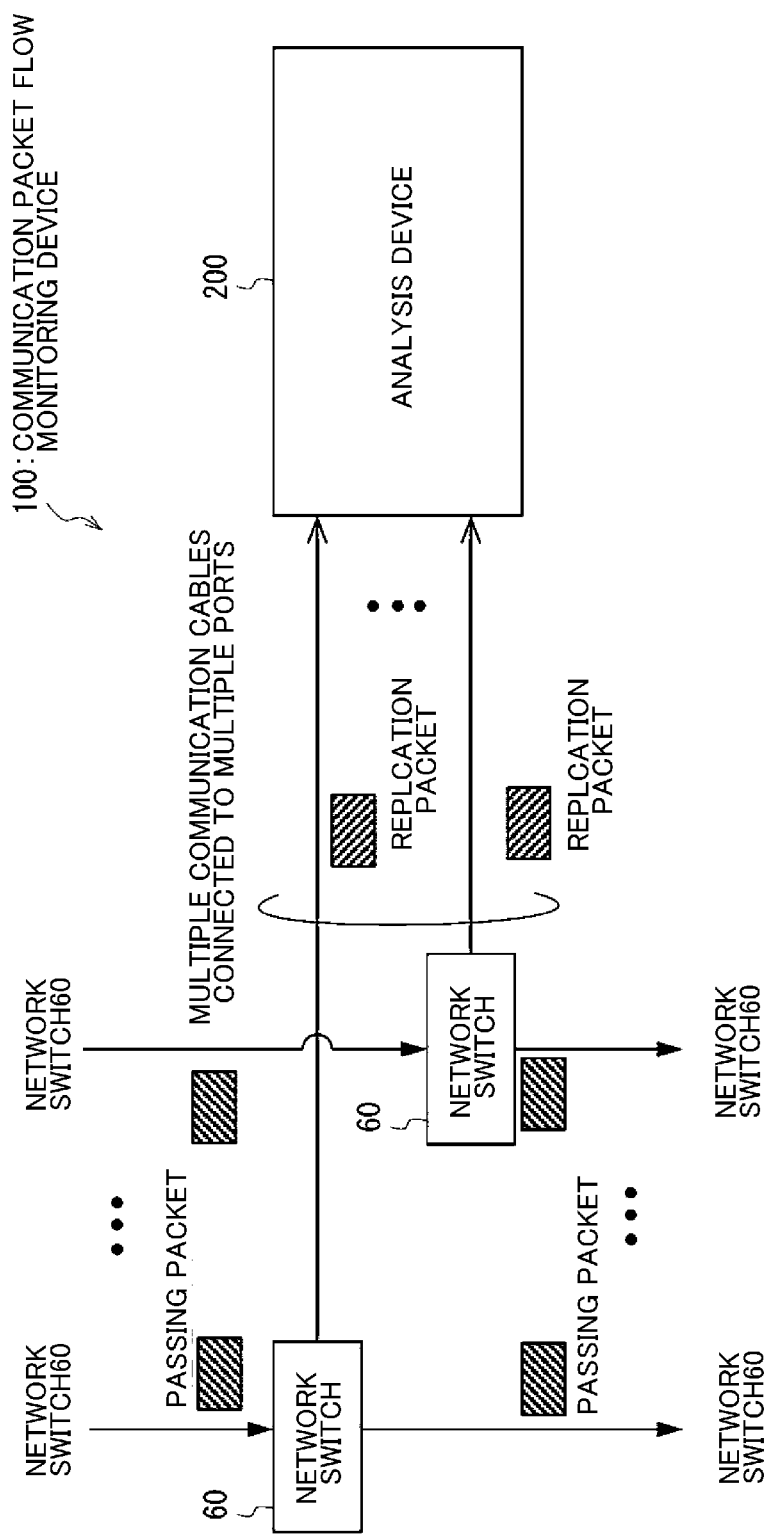
FIG. 22 is a block diagram illustrating a schematic configuration of a conventional packet flow monitoring device for communication.

The packet data extraction device 2 illustrated in FIG. 1 is a device arranged between a plurality of specific network switches 60 illustrated in FIG. 21, for example, to replicate passing packets passing between the plurality of network switches 60, and replicates each packet, extract and aggregate some predetermined pieces of information (including some pieces of information in the packet header, a part of the payload if the packet type is IGMP, and an entire part of the payload if the packet type is PTP) in the replicated passing packets to form "extraction data report packet", and transmit the extraction data report packet to the extraction data aggregation device 3. However, the packet data extraction device 2 may be mounted like a bridge device between a transmitting device such as the video transmission device 51 and the audio transmission device 52 illustrated in FIG. 21 and the network switch 60 or between the network switch 60 and the receiving device 80 and may be mounted in a specific network switch 60.

The extraction data aggregation device 3 is a device that receives the "extraction data report packet" from the packet data extraction device 2, and analyzes the "extraction data report packet" so as to aggregate the pieces of information in the replicated passing packets included in the "extraction data report packet" for each packet flow, and collectively records the aggregated information in a predetermined recording unit (an aggregation data recording unit 329 illustrated in FIG. 12) as aggregation data. The extraction data aggregation device 3 is configured to be able to output the aggregation data to external devices so that it is possible to monitor the quality related to each packet flow and measure predetermined quality information to be described later.

The packet data extraction device 2 and the extraction data aggregation device 3 are connected by a communication cable such as a LAN cable using a single port, facilitating the installation thereof. Further, when the pieces of information in the passing packets of each packet flow are extracted by the packet data extraction device 2, since the information is aggregated into the "extraction data report packet", even when a single communication cable is used, it is possible to handle the pieces of information in the passing packets of a number of packet flows and efficiently transmit the same to the extraction data aggregation device 3.

As illustrated in FIG. 1, the "extraction data report packet" is composed of IP-format packets having a variable length within a range not exceeding a predetermined packet length. Specifically, an IP header and a UDP header for performing transmission between the packet data extraction device 2 and the extraction data aggregation device 3, an "extraction data common header" (see FIG. 2(a)) composed of items common to the aggregated, replicated passing packets, and "packet-based extraction data" composed of items individually extracted for the replicated passing packets are assigned to the "extraction data report packet". Each piece of "packet-based extraction data" is configured such that an "extraction data individual header" (see FIG. 2(b)) indicating information for identifying the extracted, replicated passing packet and "extraction data" that stores some predetermined pieces of information (see FIGS. 6 to 11) in the extracted, replicated passing packet are paired with each other.

As illustrated in FIG. 2(a), a "device ID" for identifying the installed packet data extraction device 2, a "timestamp value (seconds) synchronized with PTP during reception of beginning data" indicating the reception time of beginning data of the replicated passing packet in each packet flow, and a "timestamp value (nanoseconds) synchronized with PTP during reception of beginning data" are assigned to the "extraction data common header".

On the other hand, as illustrated in FIG. 2(b), since the "extraction data individual header" only needs to indicate the relative relationship with the "extraction data common header", the amount of information for identifying the extracted passing packet is minimized. Following a reserve bit R (1 bit), a "passing packet length" indicating the length of the replicated passing packet, a data type" indicating the packet type (a value for identifying E-frame/IP/IGMP/TCP/UDP/PTP/RTP) of the replicated passing packet, and a "reception port ID" for identifying each packet flow connected by ports are assigned. Furthermore, following the reserve bit R (1 bit), an "elapsed time (nanoseconds) until the timestamp value of received PTP of beginning data from the timestamp value synchronized with PTP during reception of beginning data" indicating a temporal difference from the beginning data described in the "extraction data common header" in relation to the reception time of the passing packet extracted in the packet flow is assigned.

(Packet Data Extraction Device)

Figure 3:
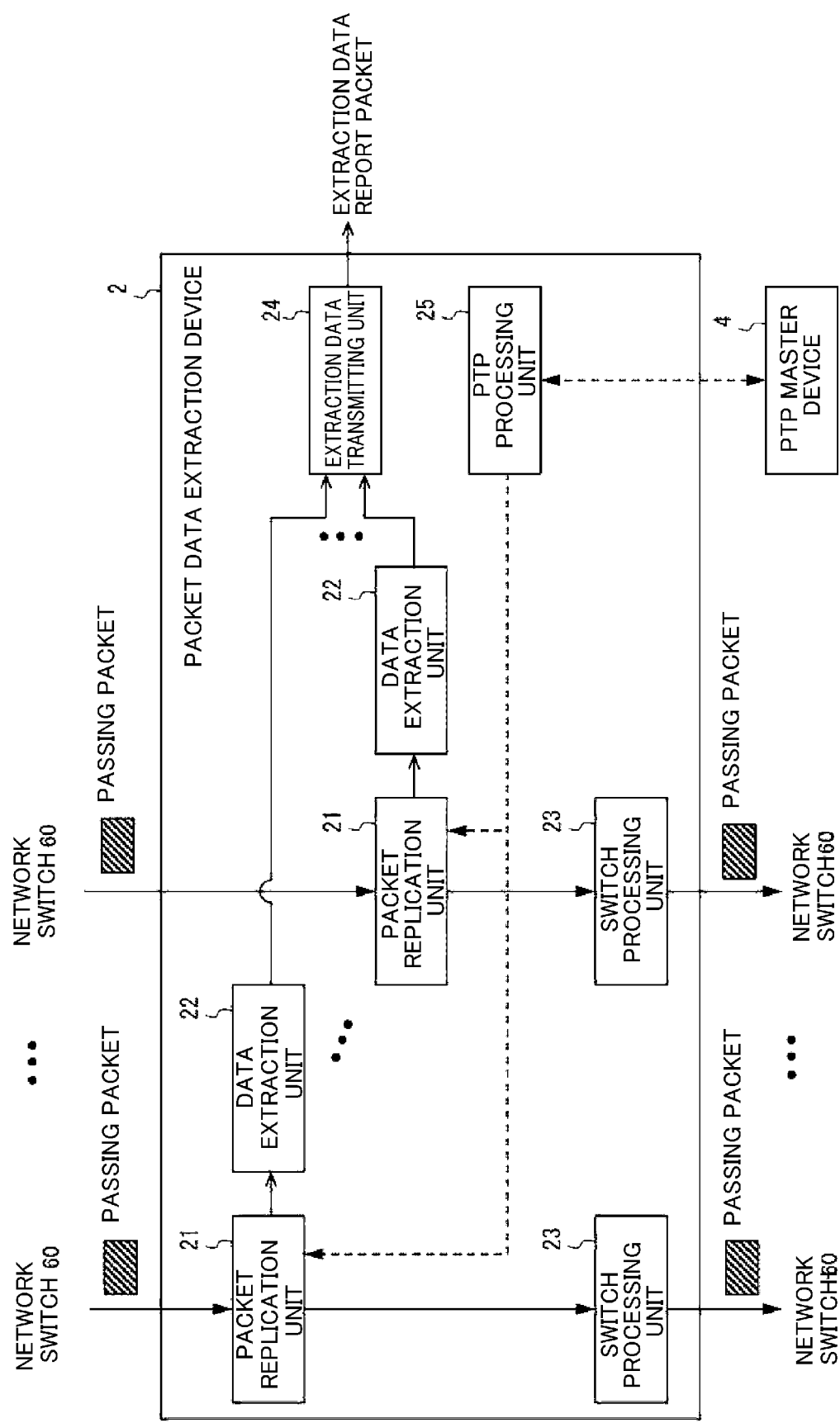
FIG. 3 is a block diagram illustrating a schematic configuration of a packet data extraction device in the packet flow monitoring device of the first embodiment according to the present invention.

FIG. 3 is a block diagram illustrating a schematic configuration of the packet data extraction device 2 in the packet flow monitoring device 1 of the first embodiment according to the present invention.

The packet data extraction device 2 includes a number of packet replication units 21, a number of data extraction units 22 and a number of switch processing units 23 corresponding to the number of extraction target ports, an extraction data transmitting unit 24, and a PTP processing unit 25.

The packet replication unit 21 temporarily stores the "reception time (timestamp value of the received PTP)" of the received passing packet in the extraction target packet flow, transmits the passing packet to the switch processing unit 23 and replicates the same, and outputs the replicated passing packet and the reception time information to the data extraction unit 22.

The data extraction unit 22 extracts the information of the "extraction data common header" and "packet-based extraction data" illustrated in FIGS. 1 and 2 from the header information of the replicated passing packet obtained from the packet replication unit 21 and the reception time information and outputs the same to the extraction data transmitting unit 24.

The switch processing unit 23 outputs the original passing packet transmitted from the packet replication unit 21 along the path of the data flow. As a result, the normal processing of the network switch 60 is maintained.

Although FIG. 1 illustrates an example in which the packet replication unit 21, the data extraction unit 22, and the switch processing unit 23 are provided for each input port for inputting the packet flow, a single packet replication unit 21, a single data extraction unit 22, and a single switch processing unit 23 may collectively process a plurality of input ports.

The extraction data transmitting unit 24 uses the extraction data output from each data extraction unit 22 as "packet-based extraction data", obtains information necessary for forming a plurality of pieces of packet-based extraction data and the "extraction data common header" (see FIG. 2(a)) and the "extraction data individual header" (see FIG. 2(b)) from each data extraction unit 22 to form an "extraction data report packet", and outputs the same to the extraction data aggregation device 3.

The PTP processing unit 25 is a processing unit that communicates with a PTP master device 4 (not illustrated in FIG. 1) in the network according to PTP (Precision Time Protocol) and synchronizes the operating time of each packet replication unit 21 in the packet data extraction device 2 with the control time of the PTP master device 4, and is similar to a general PTP processing mechanism.

(Detailed Configuration of Data Extraction Unit)

Figure 4:
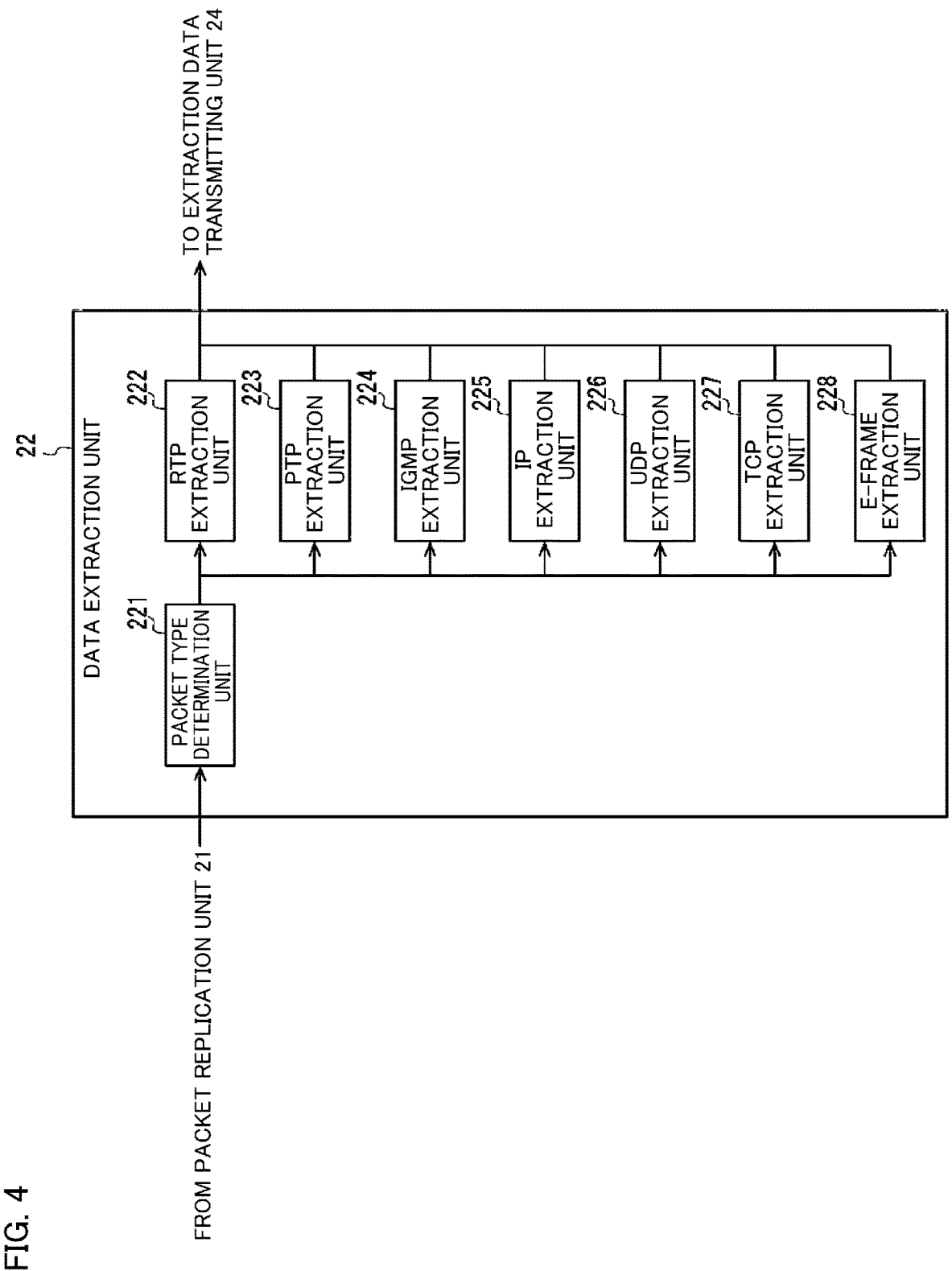
FIG. 4 is a block diagram illustrating a schematic configuration of a data extraction unit in a packet data extraction device in the packet flow monitoring device of the first embodiment according to the present invention.

FIG. 4 is a block diagram illustrating a schematic configuration of the data extraction unit 22 in the packet data extraction device 2 in the packet flow monitoring device 1 of the first embodiment according to the present invention.

The data extraction unit 22 includes a packet type determination unit 221, an RTP extraction unit 222, a PTP extraction unit 223, an IGMP extraction unit 224, an IP extraction unit 225, a UDP extraction unit 226, a TCP extraction unit 227, and an E-frame extraction unit 228.

The packet type determination unit 221 determines a packet type from the header information and the payload of the replicated passing packet obtained from the packet replication unit 21 and outputs the replicated passing packet and the reception time information to any one of the corresponding RTP extraction unit 222, PTP extraction unit 223, IGMP extraction unit 224, IP extraction unit 225, UDP extraction unit 226, TCP extraction unit 227, and E-frame extraction unit 228 according to the determination result.

The RTP extraction unit 222, the PTP extraction unit 223, the IGMP extraction unit 224, the IP extraction unit 225, the UDP extraction unit 226, the TCP extraction unit 227, and the E-frame extraction unit 228 are each configured to extract some predetermined pieces of information (see FIGS. 6 to 11) from the replicated passing packet as the "extraction data" and output the same to the extraction data transmitting unit 24.

Further, the RTP extraction unit 222, the PTP extraction unit 223, the IGMP extraction unit 224, the IP extraction unit 225, the UDP extraction unit 226, the TCP extraction unit 227, and the E-frame extraction unit 228 are each configured to identify the information of "extraction data common header" (see FIG. 2(a)) and the "extraction data individual header" (see FIG. 2(b)) necessary for forming the "extraction data report packet" illustrated in FIGS. 1 and 2 on the basis of the reception time information and output the same to the extraction data transmitting unit 24.

That is, the RTP extraction unit 222, the PTP extraction unit 223, the IGMP extraction unit 224, the IP extraction unit 225, the UDP extraction unit 226, the TCP extraction unit 227, and the E-frame extraction unit 228 are each configured to identify the "device ID" for identifying the packet data extraction device 2 to which the unit belongs, the "timestamp value (seconds) synchronized with PTP during reception of beginning data" and the "timestamp value (nanoseconds) synchronized with PTP during reception of beginning data" related to the reception time of the extracted passing packet in the corresponding packet flow, the "passing packet length" indicating the length of the corresponding passing packet, the "data type" indicating the packet type of the corresponding passing packet, and the information of "reception port ID" for identifying each packet flow and output the same to the extraction data transmitting unit 24.

As a result, the extraction data transmitting unit 24 uses the extraction data output from one or more data extraction units 22 as "packet-based extraction data", and can obtain information necessary for forming one or more pieces of packet-based extraction data and the "extraction data common header" (see FIG. 2(a)) and the "extraction data individual header" (see FIG. 2(b)) from the data extraction unit 22, forms the "extraction data report packet" composed of IP format packets having a variable length within a range not exceeding the predetermined packet length illustrated in FIG. 1, and outputs the same to the extraction data aggregation device 3.

Figure 5:
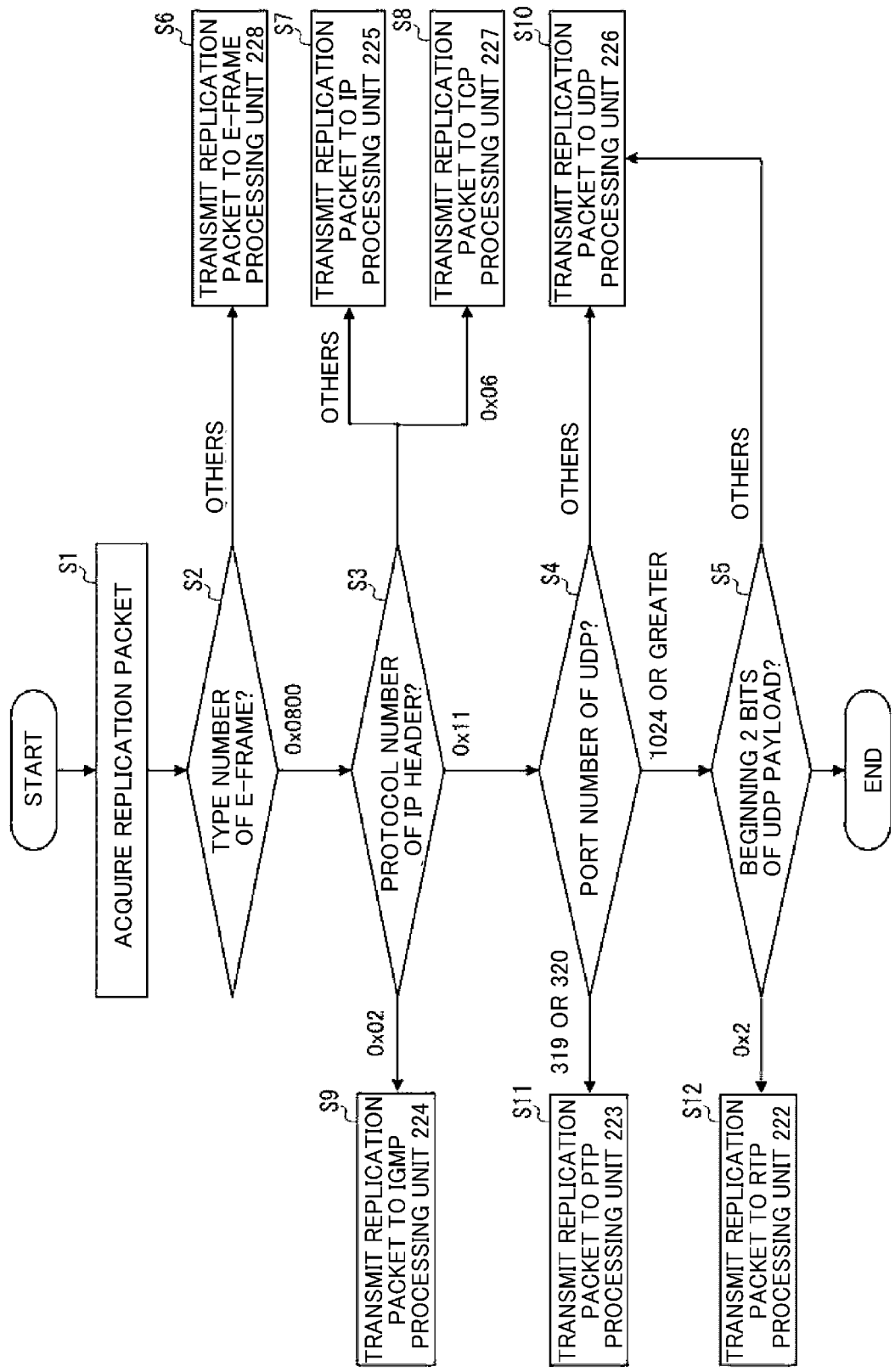
FIG. 5 is a flowchart illustrating a determination example of a packet type (data type) by a packet type determination unit in the packet data extraction device in the packet flow monitoring device of the first embodiment according to the present invention.

FIG. 5 is a flowchart illustrating a determination example of a packet type (data type) by the packet type determination unit 221 in the packet data extraction device 2 in the packet flow monitoring device 1 of the first embodiment according to the present invention.

Upon acquiring the replicate packet (step S1), the packet type determination unit 221 determines the packet type from the header information and the payload in the following procedure.

First, the packet type determination unit 221 determines whether the type number of the E-frame is indicated from the header information of the replicate packet, and whether the type number is 0x0800 when the type number of the E-frame is indicated (Step S2). The flow proceeds to step S3 if 0x0800 is indicated as the type number of the E-frame, and otherwise, the replicate packet is transmitted to the E-frame processing unit 228 (step S6).

When the flow proceeds to step S3, the packet type determination unit 221 determines whether the header information of the IP header is indicated from the header information of the replicate packet and whether the protocol number is 0x01, 0x06, or 0x11 when the header information of the IP header is indicated (step S3). The packet type determination unit 221 transmits the replicate packet to the IGMP processing unit 224 when 0x02 is indicated as the protocol number of the IP header (step S9) and transmits the replicate packet to the TCP processing unit 227 when 0x06 is indicated (step S8), and the flow proceeds to step S4 when 0x11 is indicated as the protocol number of the IP header, and otherwise, the replicate packet is transmitted to the IP processing unit 225 (step S7).

When the flow proceeds to step S4, the packet type determination unit 221 determines whether the UDP port number is indicated from the header information of the replicate packet, and determines whether the port number is 319, 320, 1024 or greater when the UDP port number is indicated (step S4). The replicate packet is transmitted to the PTP processing unit 223 when the UDP port number is 319 or 320 (step S11). The flow proceeds to step S5 when the UDP port number is 1024 or greater, and otherwise, the replicate packet is transmitted to the UDP processing unit 226 (step S10).

When the flow proceeds to step S5, the packet type determination unit 221 determines whether the first two bits are 0x2 from the payload information of the replicate packet (that is, the first two bits of the payload of UDP) (step S5). The packet type determination unit 221 transmits the replicate packet to the RTP processing unit 222 when 0x2 is indicated as the first two bits of the payload of UDP (step S12), and otherwise, the replicate packet is transmitted to the UDP processing unit 226 (step S10).

In this way, the packet type determination unit 221 can determine the packet type from the header information and the payload of the replicated passing packet obtained from the packet replication unit 21.

(Extraction Data for Each Packet Type)

FIGS. 6 to 11 illustrate signal formats of packet-based extraction data type assigned in the "extraction data report packet" illustrated in FIG. 1 in the first embodiment.

Figure 6:
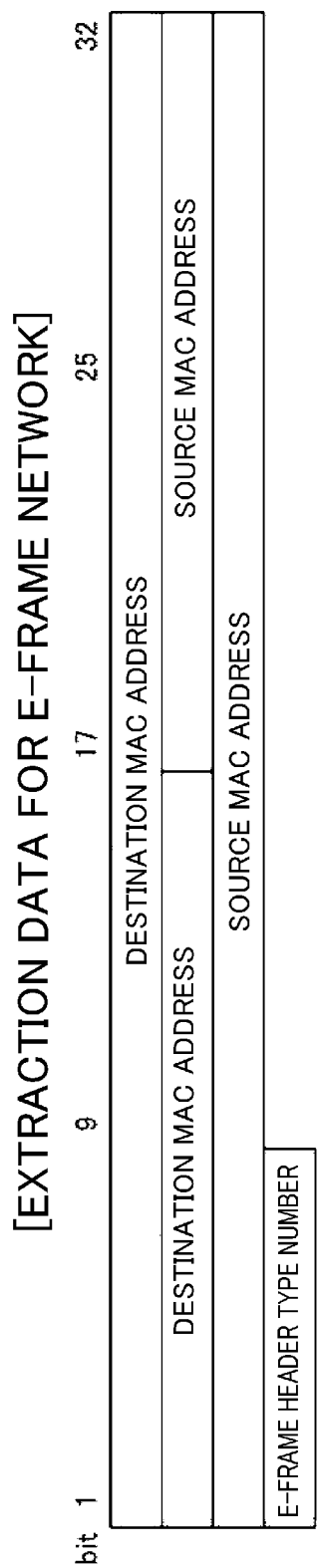
FIG. 6 is a diagram illustrating a signal format of extraction data for an E-frame network in the packet flow monitoring device of the first embodiment according to the present invention.

As illustrated in FIG. 6, the extraction data for the E-frame network includes a destination MAC address, a source MAC address, and a type number of an E-frame header.

Figure 7:
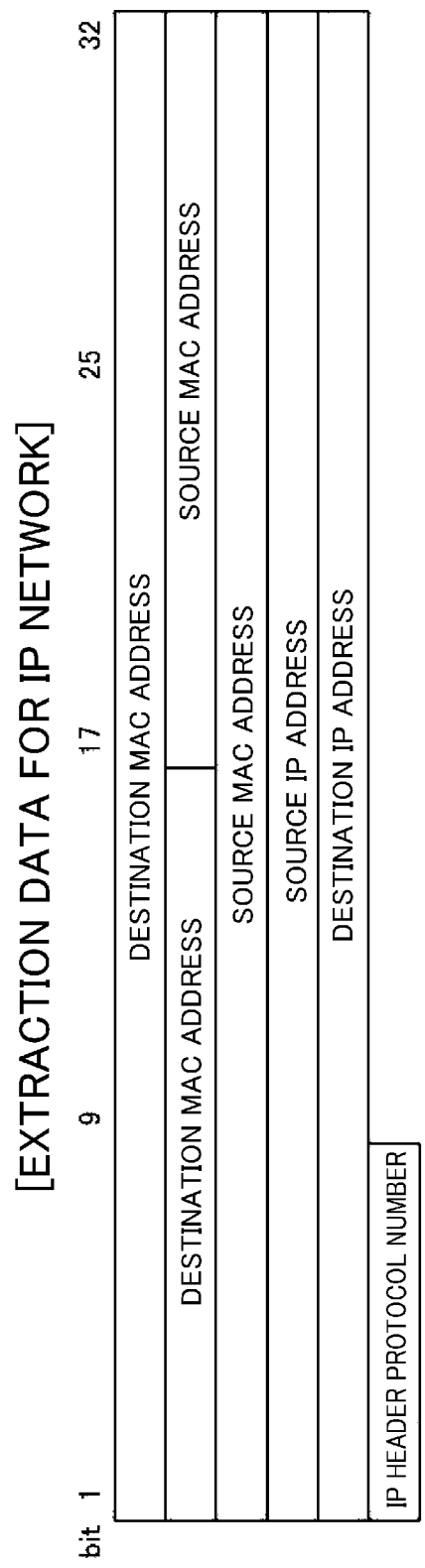
FIG. 7 is a diagram illustrating a signal format of extraction data for an IP network in the packet flow monitoring device of the first embodiment according to the present invention.

As illustrated in FIG. 7, the extraction data for the IP network includes a destination MAC address, a source MAC address, a source IP address, a destination IP address, and a protocol number of an IP header.

Figure 8:
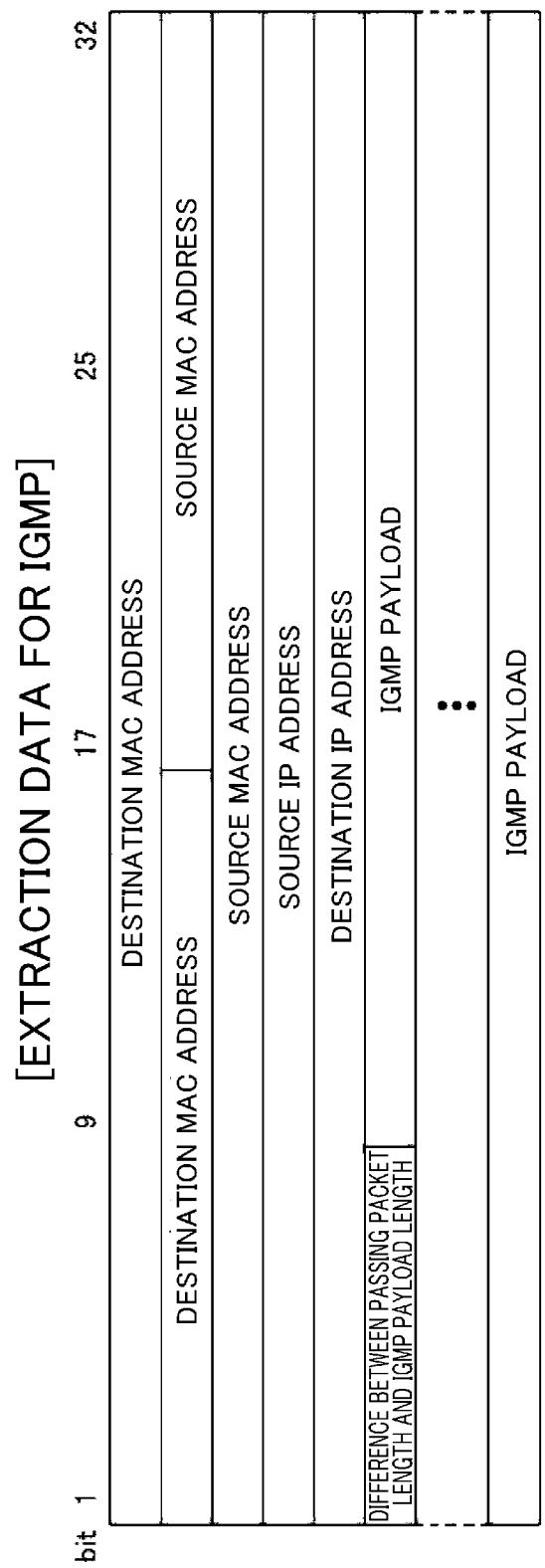
FIG. 8 is a diagram illustrating a signal format of extraction data for IGMP (Internet Group Management Protocol) in the packet flow monitoring device of the first embodiment according to the present invention.

As illustrated in FIG. 8, the extraction data for IGMP includes a destination MAC address, a source MAC address, a source IP address, a destination IP address, a difference (1 byte) between a passing packet length, and an IGMP payload length, and 39 bytes of IGMP payload from the beginning.

Figure 9:
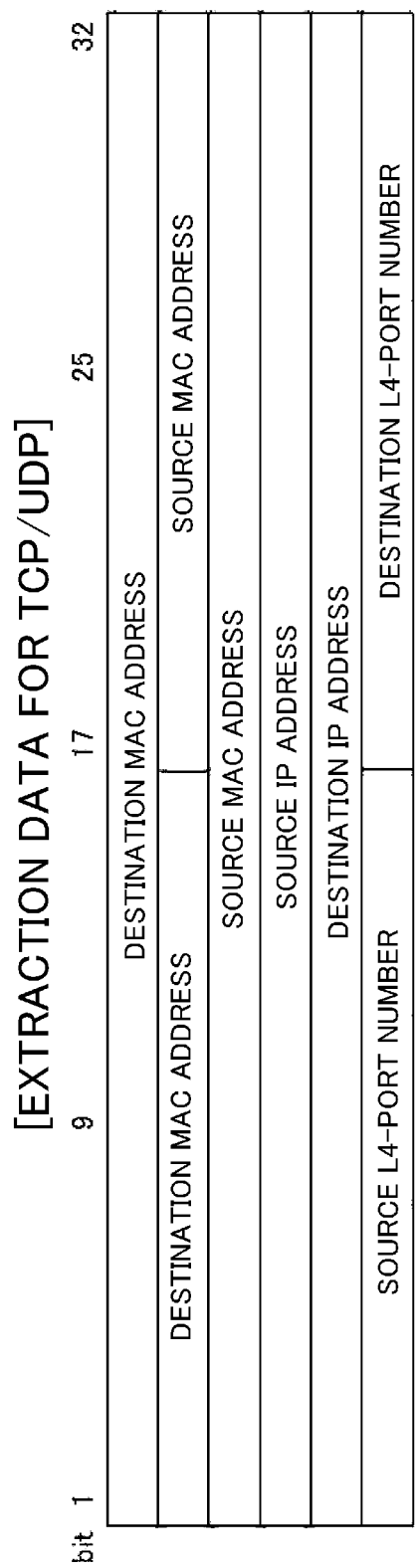
FIG. 9 is a diagram illustrating a signal format of extraction data for TCP (Transmission Control Protocol)/UDP (User Datagram Protocol) in the packet flow monitoring device of the first embodiment according to the present invention.

As illustrated in FIG. 9, the extraction data for TCP or UDP includes a destination MAC address, a source MAC address, a source IP address, a destination IP address, a source L4-port number, and a destination L4-port number.

As illustrated in FIG. 10, the extraction data for PTP includes a destination MAC address, a source MAC address, a source IP address, a destination IP address, a source L4-port number, a destination L4-port number, a difference (1 byte) between a passing packet length and (PTP header+ passing packet length), and the entire part of the PTP header and the PTP payload.

Figure 11:
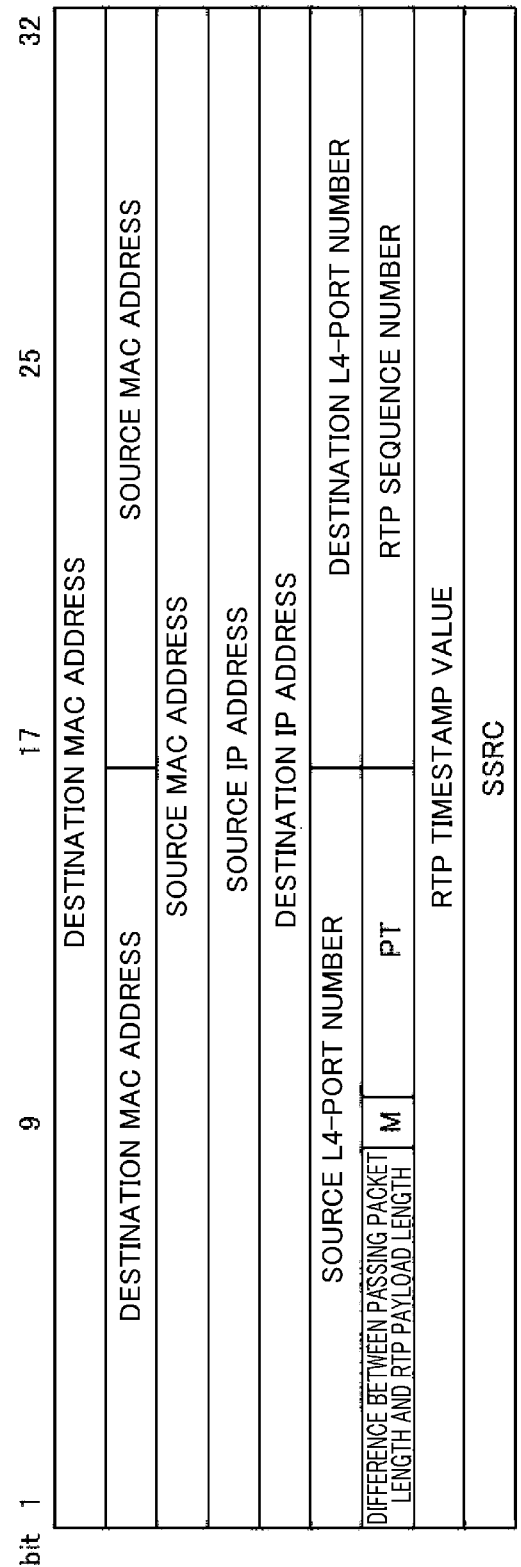
FIG. 11 is a diagram illustrating a signal format of extraction data for RTP (Real-time Transport Protocol) in the packet flow monitoring device of the first embodiment according to the present invention.

As illustrated in FIG. 11, the extraction data for RTP includes a destination MAC address, a source MAC address, a source IP address, a destination IP address, a source L4-port number, a destination L4-port number, a difference (1 byte) between a passing packet length and an RTP payload length, a marker bit M (1 bit) of the RTP header, a payload type PT (7 bits) of the RTP header, an RTP sequence number, an RTP timestamp value, and SSRC (32 bits) which is an identifier indicating the source.

As illustrated in FIGS. 6 to 11, for any of the seven types of packets, only some pieces of information which is a quality monitoring target related to packet flow is extracted as header information, the header information includes a part of the payload of IGMP when the packet type is IGMP and includes the entire payload of PTP when the packet type is PTP. Therefore, the extraction data aggregation device 3 described below can perform monitoring and quality measurement with higher convenience and higher accuracy.

(Extraction Data Aggregation Device)

Figure 12:
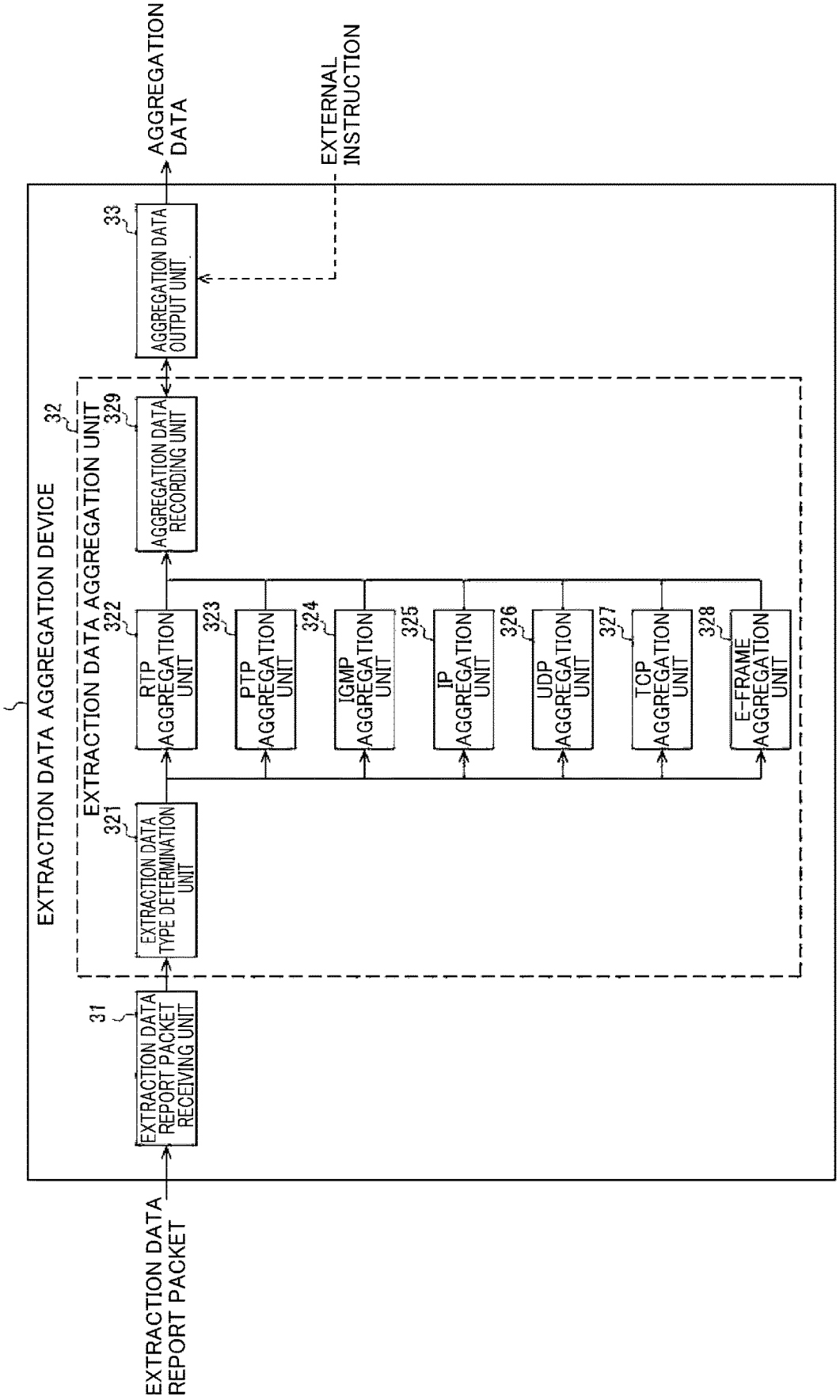
FIG. 12 is a block diagram illustrating a schematic configuration of an extraction data aggregation device in the packet flow monitoring device of the first embodiment according to the present invention.

FIG. 12 is a block diagram illustrating a schematic configuration of the extraction data aggregation device 3 in the packet flow monitoring device 1 of the first embodiment according to the present invention.

The extraction data aggregation device 3 includes an extraction data report packet receiving unit 31, an extraction data aggregation unit 32, and an aggregation data output unit 33. Further, the extraction data aggregation unit 32 includes an extraction data type determination unit 321, an RTP aggregation unit 322, a PTP aggregation unit 323, an IGMP aggregation unit 324, an IP aggregation unit 325, a UDP aggregation unit 326, a TCP aggregation unit 327, an E-frame aggregation unit 328, and an aggregation data recording unit 329.

Upon receiving the extraction data report packet from the extraction data totaling device 2, the extraction data report packet receiving unit 31 extracts the extraction data common header and packet-based extraction data and outputs the same to the extraction data aggregation unit 32.

The extraction data aggregation unit 32 analyzes the content (that is, data corresponding to each protocol) of the packet-based extraction data indicating some pieces of information in each replicated passing packet in the extraction data report packet sequentially received by the extraction data report packet receiving unit 31, aggregates the same for each packet flow, and collectively records the same in the aggregation data recording unit 329 as aggregation data.

The aggregation data output unit 33 reads the aggregation data from the aggregation data recording unit 329 in the aggregation data aggregation unit 32 according to an external instruction, and outputs the aggregation data to external devices. The aggregation data output from the aggregation data output unit 33 can be written to another general storage device (not illustrated) or transmitted to a display device (not illustrated) in an IP packet format for display. As a result, the aggregation data can be output to external devices so that the quality related to each packet flow can be monitored and predetermined quality information described later can be measured.

Here, the details of the extraction data aggregation unit 32 will be described.

The extraction data type determination unit 321 determines the packet type from the data type described in the extraction data individual header in the packet-based extraction data in the extraction data report packet sequentially received by the extraction data report packet reception unit 31 through the extraction data type determination unit 321 and outputs the extraction data common header and the packet-based extraction data to any one of the corresponding RTP aggregation unit 322, PTP aggregation unit 323, IGMP aggregation unit 324, IP aggregation unit 325, UDP aggregation unit 326, TCP aggregation unit 327, and E-frame aggregation unit 328 according to the determination result.

The RTP aggregation unit 322 analyzes the extraction data common header and the packet-based extraction data in each replicated passing packet related to RTP in the extraction data report packet sequentially received by the extraction data report packet receiving unit 31 via the extraction data type determination unit 321 to read a source MAC address, a destination MAC address, a source IP address, a destination IP address, a source L4-port number, and a destination L4-port number, aggregates an average throughput, a total number of received packets, an RTP marker bit value (M), the number of packets where M indicates 1, a packet reception interval (average/minimum/maximum), the number of packet losses, and the maximum number of burst losses using packets (replicated passing packets) of which the six items are the same as the same packet flow, generates aggregation data in which an RTP payload type number and an RTP SSRC value of the last replicated passing packet in each of the aggregated packet flows are added, and records the same in the aggregation data recording unit 329.

The PTP aggregation unit 323 analyzes the extraction data common header and the packet-based extraction data in each replicated passing packet related to RTP in the extraction data report packet sequentially received by the extraction data report packet receiving unit 31 through the extraction data type determination unit 321 to read a source MAC address, a destination MAC address, a source IP address, a destination IP address, a source L4-port number, and a destination L4-port number, aggregates an average throughput, a total number of received packets, and a transmission delay (average/minimum/maximum) using packets (replicated passing packets) of which the six items are the same as the same packet flow, generates aggregation data in which the reception time and "PTP header and payload" of the last replicated passing packet in each of the aggregated packet flows are added, and records the same in the aggregation data recording unit 329.

The IGMP aggregation unit 324 analyzes the extraction data common header and the packet-based extraction data in each replicated passing packet related to RTP in the extraction data report packet sequentially received by the extraction data report packet receiving unit 31 through the extraction data type determination unit 321 to read a source MAC address, a destination MAC address, a source IP address, and a destination IP address, aggregates an average throughput and a total number of received packets using packets (replicated passing packets) of which the four items are the same as the same packet flow, generates aggregation data in which the reception time and the IGMP payload of the last replicated passing packet in each of the aggregated packet flows are added, and records the same in the aggregation data recording unit 329.

The IP aggregation unit 325 analyzes the extraction data common header and the packet-based extraction data in each passing packet related to RTP in the extraction data report packet sequentially received by the extraction data report packet reception unit 31 through the extraction data type determination unit 321 to read a source MAC address, a destination MAC address, a source IP address, a destination IP address, and an IP header protocol number, aggregates an average throughput and a total number of received packets using packets (replicated passing packets) of which the five items are the same as the same packet flow to generate aggregation data, and records the same in the aggregation data recording unit 329.

The UDP aggregation unit 326 analyzes the extraction data common header and the packet-based extraction data in each passing packet related to RTP in the extraction data report packet sequentially received by the extraction data report packet reception unit 31 through the extraction data type determination unit 321 to read a source MAC address, a destination MAC address, a source IP address, a destination IP address, a source L4-port number, and a destination L4-port number, aggregates an average throughput and a total number of received packets using packets (replicated passing packets) of which the six items are the same as the same packet flow to generate aggregation data, and records the same in the aggregation data recording unit 329.

The TCP aggregation unit 327 analyzes the extraction data common header and the packet-based extraction data in each passing packet related to RTP in the extraction data report packet sequentially received by the extraction data report packet reception unit 31 through the extraction data type determination unit 321 to read a source MAC address, a destination MAC address, a source IP address, a destination IP address, a source L4-port number, and a destination L4-port number, aggregates an average throughput and a total number of received packets using packets (replicated passing packets) of which the six items are the same as the same packet flow to generate aggregation data, and records the same in the aggregation data recording unit 329.

The E-frame aggregation unit 328 analyzes the extraction data common header and the packet-based extraction data in each passing packet related to RTP in the extraction data report packet sequentially received by the extraction data report packet reception unit 31 through the extraction data type determination unit 321 to read a source MAC address, a destination MAC address, and an E-frame type number, aggregates an average throughput and a total number of received packets using packets (replicated passing packets) of which the three items are the same as the same packet flow to generate aggregation data, and records the same in the aggregation data recording unit 329.

The "average throughput" can be calculated from the "passing packet length" illustrated in FIG. 2, the "timestamp value synchronized with PTP during reception of beginning data", and the "elapsed time from timestamp value of received PTP of data from timestamp value synchronized with PTP during reception of beginning data".

The aggregation data recording unit 329 records the aggregation data (see FIG. 13) aggregated for each data type by the RTP aggregation unit 322, the PTP aggregation unit 323, the IGMP aggregation unit 324, the IP aggregation unit 325, the UDP aggregation unit 326, the TCP aggregation unit 327, and the E-frame aggregation unit 328.

As illustrated in FIG. 13, among the pieces of aggregation data according to the first embodiment, the E-frame aggregation data includes the source MAC address, the destination MAC address, the E-frame type number, the average throughput, and the total number of received packets for each packet flow.

Further, the IP aggregation data includes the source MAC address, the destination MAC address, the source IP address, the destination IP address, the IP header protocol number, the average throughput, and the total number of received packets for each packet flow.

In addition, the IGMP aggregation data includes the source MAC address, the destination MAC address, the source IP address, the destination IP address, the average throughput, the total number of received packets, the reception time, and the IGMP payload (39 bytes from the beginning) for each packet flow.

In addition, the TCP or UDP aggregation data includes the source MAC address, the destination MAC address, the source IP address, the destination IP address, the source L4-port number, the destination L4-port number, the average throughput, and the total number of received packets for each packet flow.

In addition, the PTP aggregation data includes the source MAC address, the destination MAC address, the source IP address, the destination IP address, the source L4-port number, the destination L4-port number, the average throughput, the total number of received packets, and the transmission delay (average/minimum/maximum), the reception time, and the PTP header and payload (entire part) for each packet flow.

In addition, the RTP aggregation data includes the source MAC address, the destination MAC address, the source IP address, the destination IP address, the source L4-port number, the destination L4-port number, the average throughput, the total number of received packets, the RTP payload type number, the RTP, SSRC, and RTP marker bit value (M), the number of packets in which M indicates 1, the packet reception interval (average/minimum/maximum), the number of packet losses, and the maximum number of burst losses for each packet flow.

According to the packet flow monitoring device 1 of the first embodiment configured as described above, it is possible to efficiently obtain aggregation data related to the packet flow of all packets in the program production system constructed by an E-frame or IP packet network and monitor and measure the quality related to packet flow with high accuracy.

In particular, according to the packet flow monitoring device 1 of the first embodiment, some predetermined pieces of information (including some pieces of information in the packet header, a part of the payload if the packet type is IGMP, and an entire part of the payload if the packet type is PTP) in the passing packet passing through an E-frame or IP packet network are extracted and aggregated to form the extraction data report packet. Therefore, it is possible to monitor and measure the quality of all packets even for information on traffic flowing through a high-throughput network (for example, signal transmission related to a 4K/8K video system as a packet flow with a high transmission rate).

Further, according to the packet flow monitoring device 1 of the first embodiment, when the some predetermined pieces of information in the passing packet are extracted, the packet type of the passing packet is determined, and the necessary information can be extracted according to the packet type. Therefore, it is possible to monitor detailed information such as throughput and a packet loss for each packet flow in real-time.

Second Embodiment (Overall Configuration)

The schematic configuration of the packet flow monitoring device 1 of the second embodiment is the same as that illustrated in FIGS. 1 to 5 and 12. However, the second embodiment is different in that the RTP extraction unit 222 of the packet data extraction device 2 illustrated in FIG. 4 includes a marker bit inspection unit 2221 and an RTP data extraction unit 2222 as illustrated in FIG. 14(*a*), and the RTP aggregation unit 322 of the extraction data aggregation device 3 illustrated in FIG. 12 includes an RTP data processing unit 3221, an RTP payload determination unit 3222, an ST 2110-20 processing unit 3223, an ST 2110-30 processing unit 3224, and an ST 2022-6 processing unit 3225 as illustrated in FIG. 14(*b*).

FIGS. 14(*a*) and 14(*b*) are block diagrams illustrating a schematic configuration of the RTP extraction unit 222 of the packet data extraction device 2 and the RTP aggregation unit 322 of the extraction data aggregation device 3 in the packet flow monitoring device 1 of the second embodiment according to the present invention, respectively. The same reference numbers are assigned to the same components as those in the first embodiment described above.

(RTP Extraction Unit)

First, as illustrated in FIG. 14(*a*), the RTP extraction unit 222 in the packet data extraction device 2 of the present embodiment includes a marker bit inspection unit 2221 and an RTP data extraction unit 2222.

The marker bit inspection unit 2221 receives the reception time information and the replicated passing packet via the packet type determination unit 221, inspects whether the value of the marker bit M is 1 or 0 from the header information in the replicated passing packet, and outputs the reception time information and the replicated passing packet to the RTP data extraction unit 2222 together with the value of the marker bit M.

The RTP data extraction unit 2222 identifies the information of the "extraction data common header" (see FIG. 2(*a*)) and the "extraction data individual header" (see FIG. 2(*b*)) necessary for forming the "extraction data report packet" illustrated in FIGS. 1 and 2 on the basis of the reception time information obtained through the packet type determination unit 221, extracts some predetermined pieces of information from the replicated passing packet as the "extraction data" according to the value of the marker bit M, and outputs the same to the extraction data transmitting unit 24.

Figure 16:
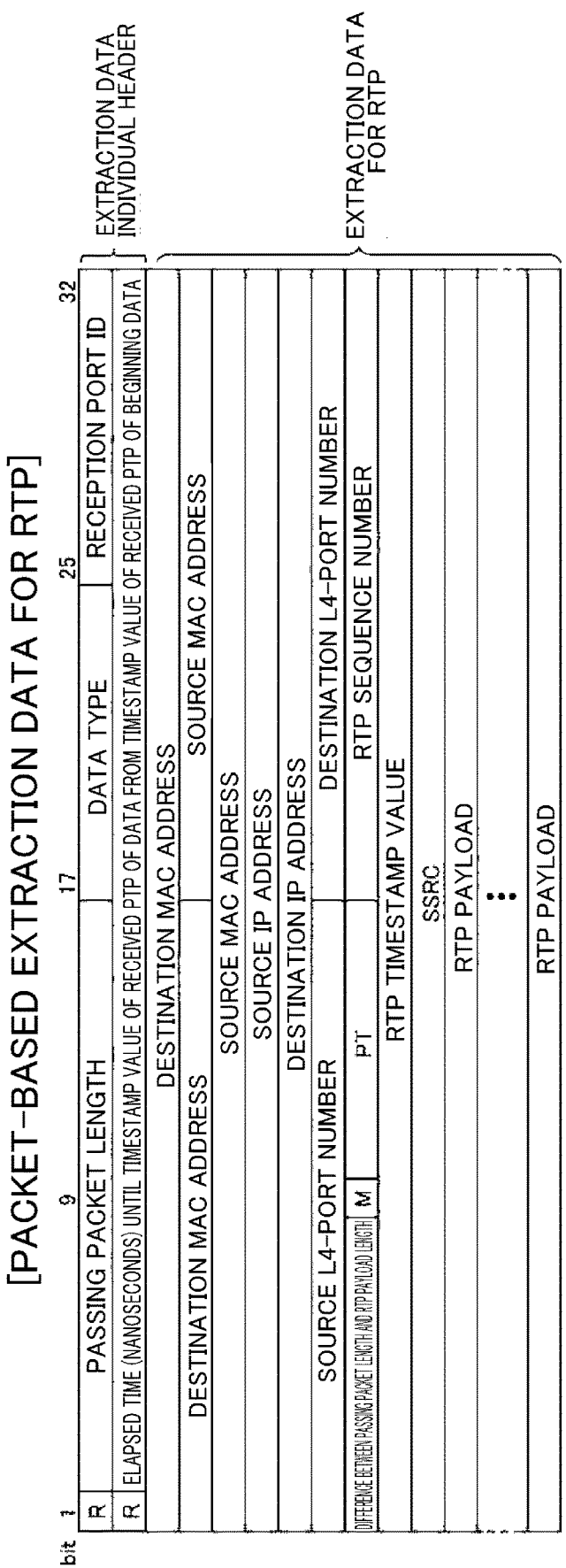
FIG. 16 is a diagram illustrating a signal format of RTP packet-based extraction data in the packet flow monitoring device of the second embodiment according to the present invention.
Figure 20:
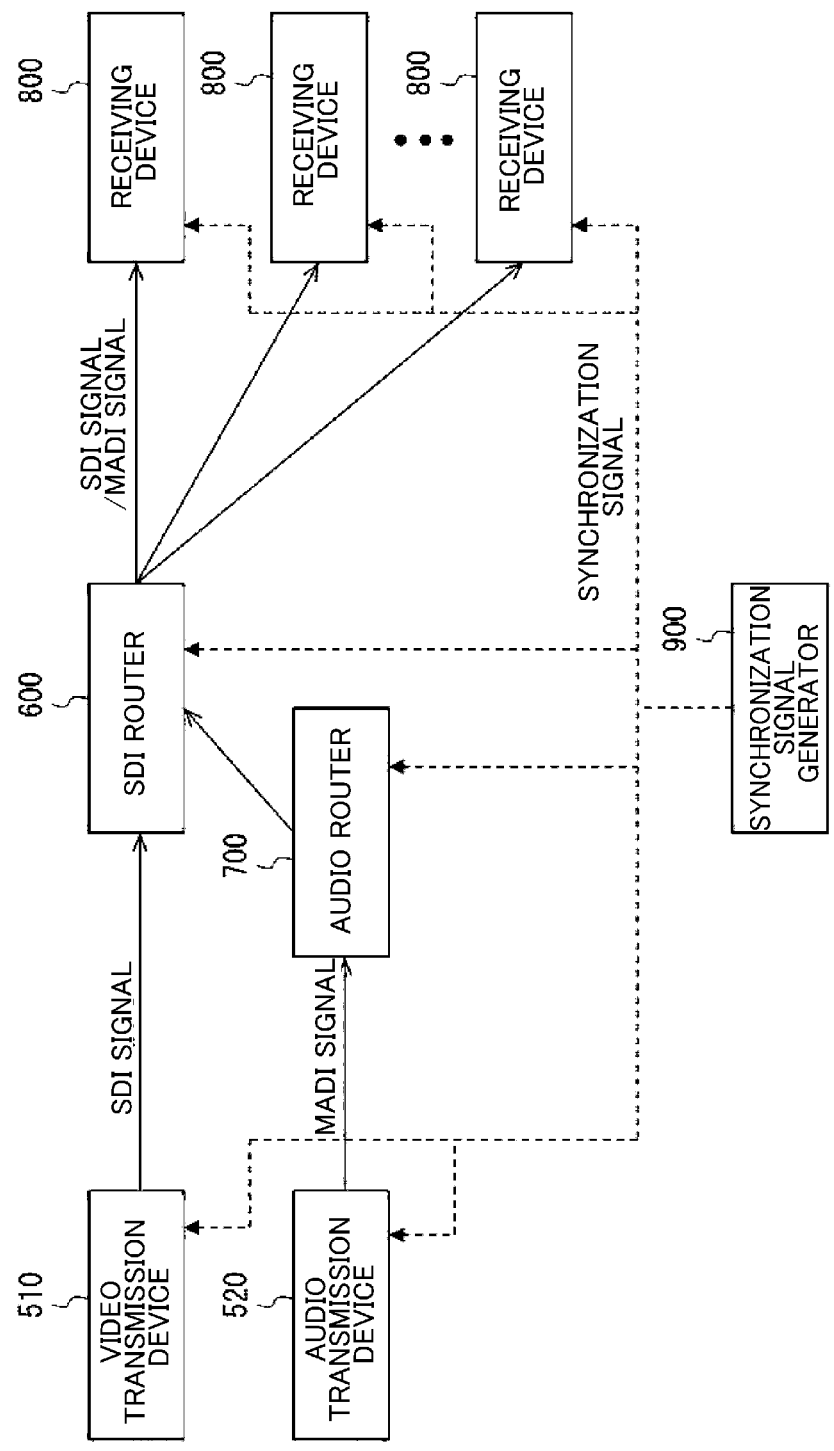
FIG. 20 is a block diagram illustrating a typical example of a conventional program production system of the SDI and MADI signal format.

Here, the RTP data extraction unit 2222 according to the second embodiment extracts the "extraction data" illustrated in FIG. 11 similar to the first embodiment when the value of the marker bit M is 0, and extracts the "extraction data" illustrated in FIG. 16 when the value of the marker bit M is 1.

That is, in the "packet-based extraction data for RTP" illustrated in FIG. 16, the "extraction data" is different from the "extraction data" illustrated in FIG. 11 according to the first embodiment in that 40 bytes of the "RPP payload" from the beginning are added. If the RTP payload stored in the replicated passing packet is less than 40 bytes, 0 is complemented as the "RPP payload" in the "extraction data" illustrated in FIG. 16.

(RTP Aggregation Unit)

On the other hand, as illustrated in FIG. 14(*b*), the RTP aggregation unit 322 in the extraction data aggregation device 3 of the present embodiment includes an RTP data processing unit 3221, an RTP payload determination unit 3222, an ST 2110-20 processing unit 3223, an ST 2110-30 processing unit 3224, and an ST 2022-6 processing unit 3225.

When the value of the marker bit M is 0, the RTP data processing unit 3221 performs data aggregation by the same operation as in the first embodiment and outputs the aggregation data to the aggregation data recording unit 329 while omitting the processes of the RTP payload determination unit 3222, the ST 2110-20 processing unit 3223, the ST 2110-30 processing unit 3224, and the ST 2022-6 processing unit 3225. However, when the value of the marker bit M is 1, the RTP data processing unit 3221 outputs the aggregation data to the aggregation data recording unit 329 through the processes of the RTP payload determination unit 3222, the ST 2110-20 processing unit 3223, the ST 2110-30 processing unit 3224, and the ST 2022-6 processing unit 3225.

That is, when the value of the marker bit M is 1, the RTP data processing unit 3221 analyzes the extraction data common header and the packet-based extraction data in each replicated passing packet related to RTP in the extraction data report packet sequentially received by the extraction data report packet receiving unit 31 via the extraction data type determination unit 321 to read a source MAC address, a destination MAC address, a source IP address, a destination IP address, a source L4-port number, and a destination L4-port number, aggregates an average throughput, a total number of received packets, the number of packets where the RTP marker bit indicates 1, a packet reception interval (average/minimum/maximum), the number of packet losses, and the maximum number of burst losses using packets (replicated passing packets) of which the six items are the same as the same packet flow, temporarily generates aggregation data in which the RTP payload type number and the RTP SSRC value of the last replicated passing packet in each of the aggregated packet flows are added, and outputs the same to the RTP payload determination unit 3222 together with the replicated passing packets.

The RTP payload determination unit 3222 compares the determination information given by an external instruction (a list in which the source IP address, the destination IP address, the source L4-port number, and the destination L4-port number are paired with information indicating to which SMPTE protocol of ST 2110-20, ST 2110-30, or ST 2022-6, the packet flow having of which the four items match corresponds) with the source IP address, the destination IP address, the source L4-port number, and the destination L4-port number of the packet being processed among the replicated passing packets obtained from the RTP data processing unit 3221. When the items match, the RTP payload determination unit 3222 transmits the packet-based extraction data of the packet being processed to the ST 2110-20 processing unit, the ST 2110-30 processing unit, and the ST 2022-6 processing unit of the corresponding SMPTE protocol together with the temporarily generated aggregation data.

The RTP payload determination unit 3222 discards the packet being processed of which the items do not match, and outputs the aggregation data temporarily aggregated by the RTP data processing unit 3221 to the aggregation data recording unit 329 as it is.

The ST 2110-20 processing unit 3223 analyzes the packet-based extraction data of the packet being processed, which is input from the RTP payload determination unit 3222 to acquire predetermined information related to video and synchronization characterized by the SMPTE ST 2110-20, adds the same to the aggregation data temporarily aggregated by the RTP data processing unit 3221, and outputs the same to the aggregation data recording unit 329.

The ST 2110-30 processing unit 3224 analyzes the packet-based extraction data of the packet being processed, which is input from the RTP payload determination unit 3222 to acquire predetermined information related to audio and synchronization characterized by the SMPTE ST 2110-

30, adds the same to the aggregation data temporarily aggregated by the RTP data processing unit 3221, and outputs the same to the aggregation data recording unit 329.

The ST 2022-6 processing unit 3225 analyzes the packet-based extraction data of the packet being processed, which is input from the RTP payload determination unit 3222 to acquire predetermined information related to video, audio, and synchronization characterized by SMPTE ST 2022-6, adds the same to the aggregation data temporarily aggregated by the RTP data processing unit 3221, and outputs the same to the aggregation data recording unit 329.

(ST 2110-20 Processing Unit)

FIGS. 15(a) and 15(b) are block diagrams illustrating a schematic configuration of the ST 2110-20 processing unit 3223 and the ST 2110-30 processing unit 3224 of the extraction data aggregation device 3 in the packet flow monitoring device 1 of the second embodiment according to the present invention, respectively.

First, as illustrated in FIG. 15(a), the ST 2110-20 processing unit 3223 includes a delay calculation unit 32231, a resolution calculation unit 32232, a frame rate calculation unit 32233, and a video scanning method identification unit 32234.

The delay calculation unit 32231 operates when the value of the marker bit M is 1, and calculates a transmission delay time (a delay time indicating average/minimum/maximum) from the RTP timestamp value (in the extraction data) and the packet reception time (the received PTP time in the extraction data individual header) in the packet-based extraction data of the packet being processed obtained from the RTP payload determination unit 3222 by the following calculation, adds the same to the aggregation data temporarily aggregated by the RTP data processing unit 3221, and outputs the same to the aggregation data recording unit 329.

$$T_{rcv\_90\ kHz} = T_{rcv\_ptp} * 90000\%0x100000000$$

$$\text{if } (T_{rcv\_90\ kHz} > RTP_{timestamp})$$

$$\text{then } D = (T_{rcv\_90\ kHz} - RTP_{timestamp})/90000$$

$$\text{else } D = (RTP_{timestamp} - T_{rcv\_90\ kHz})/90000$$

(D: Delay (seconds), $T_{rcv\_ptp}$: Received PTP time, $RTP_{timestamp}$: RTP timestamp value)

The resolution calculation unit 32232 operates when the value of the marker bit M is 1, analyzes the RTP payload in the packet-based extraction data of the packet being processed obtained from the RTP payload determination unit 3222 as the ST 2110-20 header, reads the last number of lines included in the header, determines the height of an image, acquires the width of the image using the height of the image as a key from a table held in advance, obtains the height and width of the image, and outputs the same to the aggregation data recording unit 329 so as to be added to the aggregation data temporarily aggregated by the RTP data processing unit 3221.

More specifically, the value of the 49th bit from the beginning of the ST 2110-20 header (the value of "C" illustrated in FIG. 23(a), but will be referred to as a Cont value herein) is checked. If this Cont value is 1, since the next Cont value is present 48 bits behind, the Cont value is sequentially checked until the Cont value becomes 0. When the Cont value is 0, the value of the 17th bit before the Cont value is the number of lines to be read ("Line No" illustrated in FIG. 23(a)).

Then, from the header information according to ST 2110-20 illustrated in FIG. 23(a), the height of the image can be obtained on the basis of the interlace information of the packet flow to be aggregated (the value of F in the 33rd bit of the ST 2110-20 header), the next F value, and the number of lines read. When the height of the image is obtained, the width of the image can be obtained using the height of the image as a key from a predetermined table, and the height and the width of the image can be obtained.

The frame rate calculation unit 32233 operates when the value of the marker bit M is 1 and the value of F in the 33rd bit of the ST 2110-20 header is 0, calculates the frame rate from the RTP timestamp value in the packet-based extraction data of the packet being processed obtained from the RTP payload determination unit 3222, and outputs the same to the aggregation data recording unit 329 so as to be added to the aggregation data temporarily aggregated by the RTP data processing unit 3221.

More specifically, the RTP timestamp value (initial value is 0) in the aggregation data temporarily aggregated is read, and the difference from the RTP timestamp value of the processing target packet is calculated. The frame rate is 25 fps, 29.97 fps, 30 fps, 50 fps, 59.94 fps, and 60 fps when this difference is 3600, 3003, 3000, 1800, 1501 or 1502, and 1500, respectively. The frame rate values are recorded in the aggregation data recording unit 329 so as to be added to the aggregation data temporarily aggregated. Further, the frame rate calculation unit 32233 updates the RTP timestamp value of the aggregation data recorded in the aggregation data recording unit 329 with the read RTP timestamp value.

The video scanning method identification unit 32234 operates when the value of the marker bit M is 1, and analyzes the RTP payload in the packet-based extraction data of the packet being processed obtained from the RTP payload determination unit 3222 as the ST 2110-20 header, determines from the header whether the video frame is interlaced or progressive, and outputs the determination result to the aggregation data recording unit 329 so as to be added to the aggregation data temporarily aggregated by the RTP data processing unit 3221.

(ST 2110-30 Processing Unit)

Figure 15:
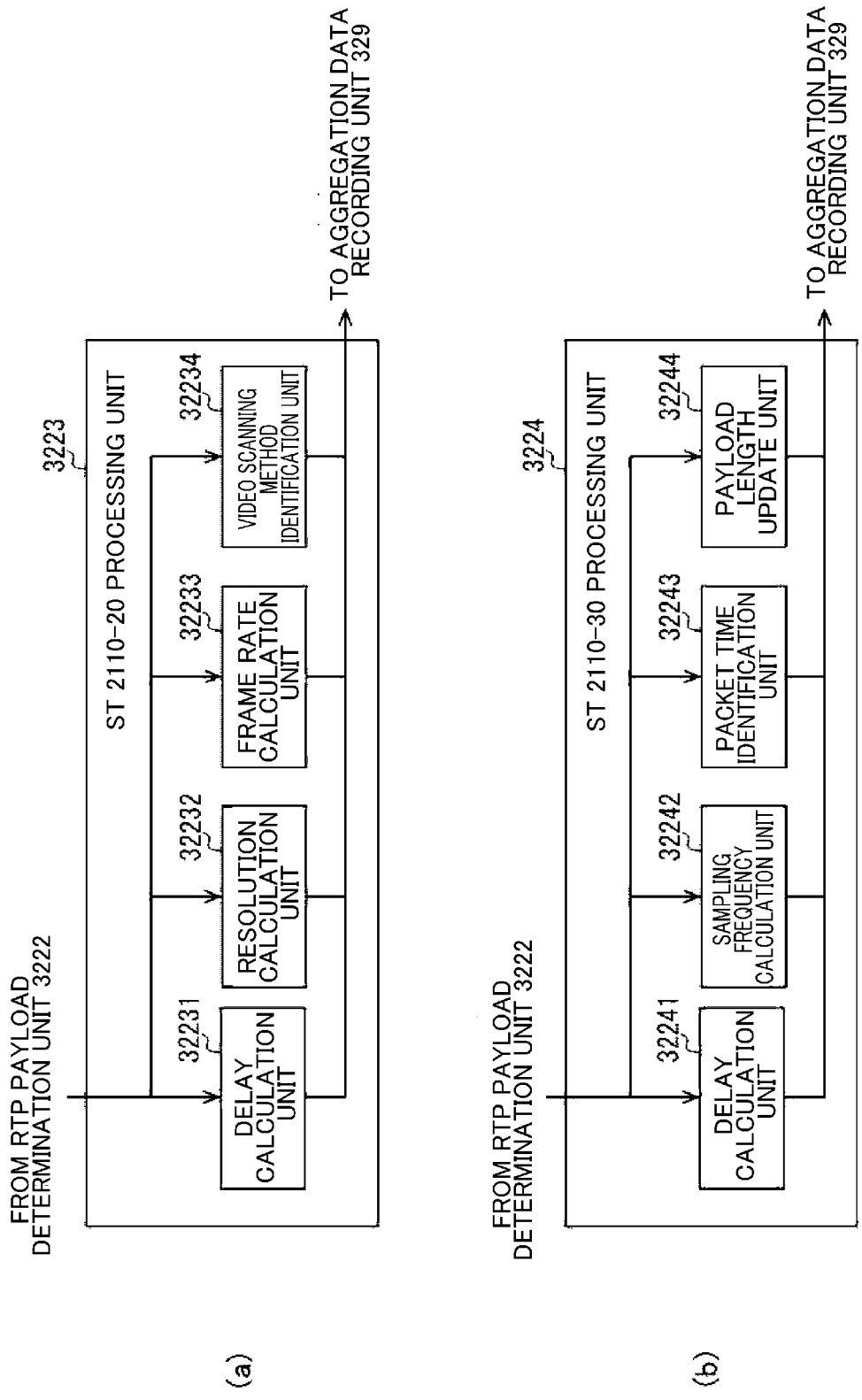
FIGS. 15(a) and 15(b) are block diagrams illustrating a schematic configuration of an ST 2110-20 processing unit and an ST 2110-30 processing unit of an extraction data aggregation device in the packet flow monitoring device of the second embodiment according to the present invention, respectively.

Next, as illustrated in FIG. 15(*b*), the ST 2110-30 processing unit 3224 includes a delay calculation unit 32241, a sampling frequency calculation unit 32242, a packet time identification unit 32243, and a payload length update unit 32244.

The sampling frequency calculation unit 32242 operates when the value of the marker bit M is 1, examines the RTP timestamp value (in the extraction data) in the packet-based extraction data of the packet being processed obtained from the RTP payload determination unit 3222, calculates the sampling frequency by calculating a difference $TS_{diff}$ of the recorded RTP timestamp (initial value 0) of one second before by the following calculation when the value of the second of the reception time of ST 2100-30 is changed from the recorded RTP timestamp (initial value 0) before one second, and outputs the same to the aggregation data recording unit 329 so as to be added to the aggregation data temporarily aggregated by the RTP data processing unit 3221. Further, the sampling frequency calculation unit 32242 updates the RTP timestamp value of the aggregation data recorded in the aggregation data recording unit 329 with the read RTP timestamp value.

if $(44100*(1-\alpha) < TS_{diff} < 44100*(1+\alpha))$ then 44.1 kHz else if $(48000*(1-\alpha) < TS_{diff} < 48000*(1+\alpha))$ then 48 kHz else if $(96000*(1-\alpha) < TS_{diff} < 96000*(1+\alpha))$ then 96 kHz else indefinite α is a parameter corresponding to network jitter, and normally, network jitter can be sufficiently covered by setting a to 0.01 seconds. Therefore, in this example, the sampling frequency calculation unit 32242 sets α=0.01 and updates the RTP timestamp of one second before of the aggregation data recording unit with the RTP timestamp value of the packet in which the value of the second of the reception time has increased.

The packet time identification unit 32243 operates when the value of the marker bit M is 1, examines the RTP timestamp value (in the extraction data) in the packet-based extraction data of the packet being processed obtained from the RTP payload determination unit 3222, calculates the packet time from a present RTP timestamp value ($RTPtimestamp_{now}$), a previous RTP timestamp value ($RTPtimestamp_{pre}$) of the aggregation data recorded in the aggregation data recording unit 329, and the sampling frequency recorded in the aggregation data recording unit 329 by the following calculation, adds the same to the aggregation data temporarily aggregated by the RTP data processing unit 3221, and outputs the same to the aggregation data recording unit 329.

Packet time (milliseconds)=1000*($RTPtimestamp_{now}$−$RTPtimestamp_{pre}$)/$F_{sample}$ The packet time identification unit 32243 does not calculate the packet time when the sampling frequency is indefinite.

The delay calculation unit 32241 is substantially the same as the operation of the delay calculation unit 32231 described above, operates when the value of the marker bit M is 1, calculates the transmission delay time (a delay time indicating the average/minimum/maximum value) from the RTP timestamp value (in the extraction data) in the packet-based extraction data of the packet being processed obtained from the RTP payload determination unit 3222 and the packet reception time (the received PTP time in the extraction data individual header) by the following calculation, and outputs the same to the aggregation data recording unit 329 so as to be added to the aggregation data temporarily aggregated by the RTP data processing unit 3221.

$T_{rcv\_fsample} = T_{rcv\_ptp} * F_{sample} \% 0x100000000$ if $(T_{rcv\_fsamle} > RTP_{timestamp})$ then $D = (T_{rcv\_fsample} - RTP_{timestamp})/F_{sample}$ else $D = (RTP_{timestamp} - T_{rcv\_fsample})/F_{sample}$ (D: Delay (seconds), $T_{rcv\_ptp}$: Received PTP time, $RTP_{timestamp}$: RTP timestamp value, and $F_{sample}$: Sampling frequency)

The delay calculation unit 32241 does not calculate the transmission delay time (delay time indicating the average/minimum/maximum value) when the sampling frequency is indefinite.

The payload length update unit 32244 operates when the value of the marker bit M is 1, calculates the difference between the "passing packet length" (in the extraction data individual header)" in the packet-based extraction data of the packet being processed obtained from the RTP payload determination unit 3222 and the "difference between passing packet length and RTP passing packet length" (in the extraction data) included in the extraction data in the case of RTP, and outputs the same to the aggregation data recording unit 329 so as to update the payload length in the aggregation data temporarily aggregated by the RTP data processing unit 3221 with the calculated payload length.

(ST 2022-6 Processing Unit)

The ST 2022-6 processing unit operates when the value of the marker bit M is 1, analyzes the RTP payload in the packet-based extraction data of the packet being processed obtained from the RTP payload determination unit 3222 as the ST 2022-6 header (FIG. 23(b)), extract the values of MAP, FRAME, FRATE, SAMPLE, and R included in the header, and outputs the same to the aggregation data recording unit 329 so as to update the payload length in the aggregation data temporarily aggregated by the RTP data processing unit 3221.

Therefore, the aggregation data recording unit 329 according to the present embodiment adds and records the aggregation data to the aggregation data of the first embodiment individually according to the SMPTE protocols of ST 2110-20, ST 2110-30, and ST 2022-6 as RTP aggregation data (see FIG. 17) with the aid of the RTP aggregated unit 322 illustrated in FIG. 14(b).

That is, as illustrated in FIG. 17, the data on the right side of the figure is aggregated data added to the aggregation data of the first embodiment on the left side of the figure.

More specifically, for (ST 2110-20), the respective values of data output by RTP, a resolution, a frame rate, identification of interlaced/progressive, and transmission delay (average/minimum/maximum) are added to the aggregation data.

For (ST 2110-30), the respective values of data output by RTP, a sampling frequency, a packet time, a payload length, and transmission delay (average/minimum/maximum) are added to the aggregation data.

Regarding (ST 2022-6), the data output by RTP, the MAP value in ST 2022-6, the frame value in ST 2022-6, the FRATE value in ST 2022-6, the SAMPLE value in ST 2022-6, and the R-value in ST 2022-6 are added to the aggregation data.

According to the packet flow monitoring device 1 of the second embodiment configured as described above, in addition to the effects of the first embodiment, more detailed information such as the delay of the video or audio signal used in the program production system, the video resolution, and the like can be monitored in real-time.

Third Embodiment (Overall Configuration)

The schematic configuration of the packet flow monitoring device 1 of the third embodiment is the same as that illustrated in FIGS. 1 to 5 and 12, and is an example in which data can be compressed before forming the extraction data report packet. However, the third embodiment is different in that the extraction data transmitting unit 24 of the packet data extraction device 2 illustrated in FIG. 3 includes a number of extraction data compression unit 241 and extraction data storage units 242 corresponding to the number of extraction target ports, and an extraction data report packet transmitting units 243 as illustrated in FIG. 18(a), and the extraction data report packet receiving unit 31 of the extraction data aggregation device 3 illustrated in FIG. 12 includes an extraction data restoration unit 311 and an extraction data storage unit 312 as illustrated in FIG. 18(b).

Since the packet flow monitoring device 1 of the third embodiment can be configured as a modified example of the first embodiment and further as a modified example of the second embodiment, an example in which the packet flow monitoring device 1 is configured as a modified example of the second embodiment will be described.

That is, in order to facilitate the understanding of the configuration according to the third embodiment, "packet-based extraction data for RTP" will be described as a representative example. However, the "packet-based extraction data for RTP" according to the third embodiment is different from the "RTP packet-based extraction data" according to the second embodiment illustrated in FIG. 16 in that as illustrated in 19, a data compression presence/absence flag C indicating the presence/absence of data compression and data compression position flags DM, SM, SI, DI, SP, DP, TS, and SS indicating the data position of data compression are assigned to predetermined positions.

The data compression presence/absence flag C indicates 1 when data compression is performed in the extraction data, and 0 when data compression is not performed.

The data compression position flag DM indicates 1 when data is omitted with respect to the destination MAC address, and 0 when data is not omitted.

The data compression position flag SM indicates 1 when data is omitted with respect to the source MAC address, and 0 when data is not omitted.

The data compression position flag SI indicates 1 when data is omitted with respect to the source IP address, and 0 when data is not omitted.

The data compression position flag DI indicates 1 when the data is omitted with respect to the destination IP address, and 0 when the data is not omitted.

The data compression position flag SP indicates 1 when data is omitted with respect to the source L4-port number, and 0 when data is not omitted.

The data compression position flag DP indicates 1 when data is omitted with respect to the destination L4-port number, and 0 when data is not omitted.

The data compression position flag TS indicates 1 when the data is omitted with respect to the RTP timestamp value, and 0 when the data is not omitted. The data compression position flag SS indicates 1 when data is omitted for SSRC, and 0 when data is not omitted.

(Extraction Data Transmitting Unit)

FIGS. 18(a) and 18(b) are block diagrams illustrating the schematic configuration of the extraction data transmitting unit 24 of the packet data extraction device 2 and the extraction data report packet receiving unit 31 of the extraction data aggregation device 3 in the packet flow monitoring device 1 of the third embodiment of the present invention, respectively. The same reference numbers are assigned to the same components as those in the above-described embodiments.

First, as illustrated in FIG. 18(a), the extraction data transmitting unit 24 of the packet data extraction device 2 of the present embodiment includes a number of extraction data compression units 241 and extraction data storage units 242 corresponding to the number of extraction target ports and an extraction data report packet transmitting unit 243. The extraction data compression units 241 as many as the number of extraction target ports are arranged in respective input ports of the packet data extraction device 2, and are configured such that data compression is performed before forming an extraction data report packet for each input port. That is, when the packet data extraction device 2 creates the extraction data, the data compression is performed for the extraction data to be stored in the same extraction data report packet received on the same port (same packet flow).

The extraction data compression unit 241 sequentially stores the data received from the data extraction unit 22 in a built-in queue (not illustrated). When data that can be output to the extraction data report packet transmitting unit 243 is not present in the queue, the extraction data compression unit 241 notifies the extraction data report packet transmitting unit 243 of the fact that data is not present.

Then, when the data that can be output to the extraction data report packet transmitting unit 243 is present in the queue, the extraction data compression unit 241 reads the beginning data of the queue in the following procedure to generate the packet-based extraction data and outputs the same to the extraction data report packet transmitting unit 243.

Here, when a state where data can be output to the extraction data aggregation device 3 as an "extraction data report packet" is created, the extraction data report packet transmitting unit 243 outputs "compressibility information," "maximum data length", and "reception time (timestamp value of received PTP based on reception of beginning data illustrated in FIG. 2)" to the extraction data compression unit 241 as compression request information, and requests the extraction data compression unit 241 to output "packet-based extraction data" serving as a transmission target.

First, when the compressibility information is "non-compressible", the extraction data compression unit 241 sets the 33rd bit (C) of the extraction data individual header to 0, creates packet-based extraction data corresponding to the data type from the beginning data of the queue, and temporarily stores the same in the extraction data storage unit 242, and outputs the same to the extraction data report packet transmitting unit 243.

On the other hand, when the compressibility information is "compressible", the extraction data compression unit 241 compares the "destination MAC address", "source MAC address", "destination IP address", "source MAC address," "destination L4-port number", "source L4-port number", "RTP timestamp", and "RTP SSRC" of the beginning data of the queue with these eight items temporarily stored in the extraction data storage unit 242. If at least one of these items is the same, the extraction data compression unit 241 sets the 33rd bit (data compression presence/absence flag C) of the extraction data individual header to 1, and inserts the data compression position flag (1 byte) immediately after the extraction data individual header (see FIG. 19).

After inserting the data compression position flag (1 byte), the extraction data compression unit 241 creates packet-based extraction data corresponding to the data type by setting the corresponding bits of the data compression position flag to 1 for items in which the value of the data temporarily stored in the extraction data storage unit 242 is the same as the beginning data of the queue without including the data of the items having the same value in the extraction data and setting the corresponding bit of the data compression position flag to 0 for items having different values while including the data of the items having different values.

At this time, the extraction data compression unit 241 performs the same processing as in the case where compression is not possible when there is no same item. If the beginning data of the queue is, for example, data output from the IP extraction unit 225, this data does not include the RTP timestamp value. As described above, the extraction data compression unit 241 sets the corresponding bits of the data compression position flag to 0 for items that are not included depending on the data type.

Further, when the data length of the packet-based extraction data is equal to or less than the "maximum data length" indicated by the compression request received from the extraction data report packet transmitting unit 243, the extraction data compression unit 241 outputs the packet-based extraction data to the extraction data report packet transmitting unit 243, temporarily stores the items included in the beginning data of the queue among the eight items in the extraction data storage unit 242, and discards the beginning data of the queue.

On the other hand, when the data length of the packet-based extraction data is larger than the "maximum data length" indicated by the compression request received from the extraction data report packet transmitting unit 243, the extraction data compression unit 241 notifies the extraction data report packet transmitting unit 243 of the fact that the data cannot be output.

As described above, when a state where data can be output to the extraction data aggregation device 3 as an "extraction data report packet" is created, the extraction data report packet transmitting unit 243 outputs "compressibility information," "maximum data length", and "reception time (timestamp value of received PTP based on reception of beginning data illustrated in FIG. 2)" to the extraction data compression unit 241 as compression request information, and requests the extraction data compression unit 241 to output "packet-based extraction data" serving as a transmission target.

This compressibility information is "non-compressible" when the data request to the extraction data compression unit 241 which is a request destination is the first request after the extraction data report packet transmitting unit 243 transmits the extraction data report packet to the extraction data aggregation device 3, and is "compressible" when the data request is the second request.

The maximum data length is the difference between a predetermined maximum payload length of the extraction data report packet and the sum of the data length of the packet-based extraction data that the extraction data report packet transmitting unit 243 has already acquired from the respective extraction data compression unit 241.

Further, if the extraction data report packet transmitting unit 243 has not yet acquired the packet-based extraction data that can be transmitted to the extraction data aggregation device 3, the "reception time" of the packet-based extraction data at the beginning of the extraction data report packet is a value indicating the effect (for example, "−1"). If there is already the packet-based extraction data that can be transmitted, the "reception time" is the reception time of the beginning data.

The extraction data report packet transmitting unit 243 outputs the extraction data report packet to the extraction data aggregation device 3 when a predetermined time has elapsed after receiving the notification that extraction is not possible from the extraction data compression unit 243 or acquiring the beginning data.

(Extraction Data Report Packet Receiving Unit)

As illustrated in FIG. 18(b), the extraction data report packet receiving unit 31 of the extraction data aggregation device 3 illustrated in FIG. 12 includes the extraction data restoration unit 311 and the extraction data storage unit 312.

Upon receiving the extraction data report packet from the packet data extraction device 2 according to the present embodiment, the extraction data restoration unit 311 reads the extraction data common header and the packet-based extraction data from the extraction data report packet, executes a process of restoring the extraction data when the data is compressed, and outputs the execution result to the extraction data aggregation unit 32.

More specifically, when the 33rd bit (data compression presence/absence flag C) of the extraction data individual header of the packet-based extraction data in the received extraction data report packet is 0, first, the extraction data storage unit 312 stores items included in the packet-based extraction data among the "source MAC address", "destination MAC address", "source IP address", "destination IP address", "source L4-port number", "destination L4-port number", "RTP timestamp value," and "RTP SSRC" in the extraction data storage unit 312 using the device ID and the reception port ID as a key.

Subsequently, when the 33rd bit (data compression presence/absence flag C) of the extraction data individual header of the packet-based extraction data is 1, the extraction data storage unit 312 reads items in which the data compression presence/absence flag C is 1 among the "source MAC address", "destination MAC address", "source IP address", "destination IP address", "source L4-port number", "destination L4-port number", "RTP timestamp value", and "RTP SSRC" using the device ID and the reception port ID as a key and complements the packet-based extraction data. After this complementation, the extraction data storage unit 312 stores the items included in the packet-based extraction data among the eight items in the extraction data storage unit 312, and outputs the packet-based extraction data after processing and the extraction data common header to the extraction data aggregation unit 32.

According to the packet flow monitoring device 1 of the third embodiment configured as described above, in addition to the effects of the first embodiment, further, in addition to the effects of the second embodiment, it is possible to efficiently transmit a packet flow composed of a large number of IP packets having the same IP address and port number and the like, like MPTE ST 2110, for example, to the extraction data aggregation unit 32.

With respect to the examples of the above-described embodiments, a computer may be configured to function as the packet data extraction device 2 or the extraction data aggregation device 3. Specifically, the functions of the packet data extraction device 2 or the extraction data aggregation device 3 can be realized by causing a central processing unit (CPU) in the computer to read and execute a program stored in the computer or an external storage unit. Further, the program for realizing the functions of the packet data extraction device 2 or the extraction data aggregation device 3 can be configured as a part of the software on the OS used in the computer. Further, the program for realizing the functions of the packet data extraction device 2 or the extraction data aggregation device 3 can be recorded and carried on a computer-readable recording medium. Further, the functions of the packet data extraction device 2 or the extraction data aggregation device 3 can be configured as a part of hardware or software, and can be realized by a combination thereof.

Although the present invention has been described by way of examples of specific embodiments, the present invention is not limited to the examples of the above-described embodiments, and various modifications can be made without departing from the technical idea. For example, in the above-described example of the third embodiment, the data compression related to the RTP extraction data has been described as a representative example. However, when the data compression related to the extraction data of another packet type (data type) is performed, the data compression presence/absence flag and the data compression position flag can be similarly utilized.

Further, in the example of the above-described embodiment, an example of monitoring the packet flow in the program production system for transmitting video or the like by applying the packet flow monitoring device according to the present invention has been described, but the present invention can be applied to any video or audio communication system. That is, the packet flow monitoring device according to the present invention can be configured as a device for monitoring packet flow in a video or audio communication system constructed by an Ethernet (registered trademark) or IP packet network. Therefore, the present invention is not limited to the examples of the above-described embodiments, but is limited only by the scope of claims.

According to the present invention, since it is possible to efficiently and highly accurately monitor and measure the quality related to the packet flow of all packets in a program production system constructed by an E-frame or IP packet network, the present invention is useful for monitoring the packet flow in a program production system.

REFERENCE SIGNS LIST

1: Packet flow monitoring device
2: Packet data extraction device
3: Extraction data aggregation device
4: PTP master device
21: Packet replication unit
22: Data extraction unit
23: Switch processing unit
24: Extraction data transmitting unit
25: PTP processing unit
31: Extraction data report packet receiving unit
32: Extraction data aggregation unit
33: Aggregation data output unit
51: Video transmission device
52: Audio transmission device
60: Network switch
80: Receiving device
90: Synchronous signal generator
100: Communication packet flow monitoring device
200: Analysis device
221: Packet type determination unit
222: RTP extraction unit
223: PTP extraction unit
224: IGMP extraction unit
225: IP extraction unit
226: UDP extraction unit
227: TCP extraction unit
228: E-frame extraction unit
241: Extraction data compression unit
242: Extraction data storage unit
243: Extraction data report packet transmitting unit
311: Extraction data restoration unit
312: Extraction data storage unit
321: Extraction data type determination unit
322: RTP aggregation unit
323: PTP aggregation unit
324: IGMP aggregation unit
325: IP Aggregation unit
326: UDP aggregation unit
327: TCP aggregation unit
328: E-frame aggregation unit
329: Aggregation data recording unit
510: Video transmission device
520: Audio transmission device
600: SDI router 700: Audio router
800: Receiving device
900: Synchronization signal generator
2221: Marker bit inspection unit
2222: RTP data extraction unit
3221: RTP data processing unit
3222: RTP payload determination unit
3223: ST 2110-20 processing unit
3224: ST 2110-30 processing unit
3225: ST 2022-6 Processing unit
32231: Delay calculation unit
32232: Resolution calculation unit
32233: Frame rate calculation unit
32234: Video scanning method identification unit
32241: Delay calculation unit
32242: Sampling frequency calculation unit
32243: Packet time identification unit
32244: Payload length update unit

What is claimed is:

1. A packet flow monitoring device that monitors packet flow in a video or audio communication system constructed by an Ethernet or IP (Internet Protocol) packet network, comprising:
a packet data extraction computer that is programmed to replicate all passing packets that pass through one or a plurality of specific network switches on the network, and extract and aggregate predetermined pieces of information in the replicated passing packets to form and output an extraction data report packet; and
an extraction data aggregation computer that is programmed to receive the extraction data report packet, analyze the extraction data report packet so as to aggregate the predetermined pieces of information in the replicated passing packets included in the extraction data report packet for each packet flow, and record the aggregated predetermined pieces of information as aggregation data, wherein
the extraction data report packet is composed of IP-format packets having a variable length within a range not exceeding a predetermined packet length,
an IP header and a User Datagram Protocol (UDP) header for performing transmission between the packet data extraction computer and the extraction data aggregation computer, an extraction data common header composed of items common to the aggregated, replicated passing packets, and packet-based extraction data composed of items individually extracted for the replicated passing packets are assigned to the extraction data report packet, and
the packet-based extraction data is configured such that an extraction data individual header indicating information for identifying the extracted, replicated passing packets and extraction data that stores the predetermined pieces of information in the extracted, replicated passing packets are paired with each other, wherein
the extraction data common header includes a value indicating a reception time of beginning data of the replicated passing packets in each packet flow,
the extraction data individual header includes a passing packet length indicating a length of a replicated passing packet, a data type indicating a packet type of the replicated passing packet, and elapsed time information indicating a temporal difference from the beginning data described in the extraction data common header, and
the packet type includes a value that identifies at least Ethernet, IP, and RTP (Real-time Transport Protocol).

2. The packet flow monitoring device according to claim 1, wherein
the packet data extraction computer and the extraction data aggregation computer are connected by a communication cable using a single port.

3. The packet flow monitoring device according to claim 1, wherein
the packet type further includes a value that identifies IGMP (Internet Group Management Protocol), TCP (Transmission Control Protocol), UDP (User Datagram Protocol), and PTP (Precision Time Protocol).

4. The packet flow monitoring device according to claim 3, wherein
the predetermined pieces of information extracted by the packet data extraction computer include:
extraction data for Ethernet including a destination media access control (MAC) address, a source MAC address, and a type number of an E-frame header,
extraction data for IP network including a destination MAC address, a source MAC address, a source IP address, a destination IP address, and a protocol number of an IP header,
extraction data for IGMP including a destination MAC address, a source MAC address, a source IP address, a destination IP address, a difference between a passing packet length and an IGMP payload length, and a predetermined amount of an IGMP payload from the beginning,
extraction data for TCP or UDP including a destination MAC address, a source MAC address, a source IP address, a destination IP address, a source L4-port number, and a destination L4-port number,
extraction data for PTP including a destination MAC address, a source MAC address, a source IP address, a destination IP address, a source L4-port number, a destination L4-port number, a difference between a passing packet length and a PTP header and payload length, and an entire part of a PTP header and PTP payload, and
extraction data for RTP including a destination MAC address, a source MAC address, a source IP address, a destination IP address, a source L4-port number, a destination L4-port number, a difference between a passing packet length and a RTP payload length, a marker bit of an RTP header, a payload type of an RTP header, an RTP sequence number, an RTP timestamp value, and a synchronization source (SSRC) that is an identifier indicating a source.

5. The packet flow monitoring device according to claim 4, wherein
the extraction data aggregation computer analyzes the extraction data common header and the packet-based extraction data in each of the replicated passing packets in the extraction data report packet received sequentially to generate aggregation data for each packet flow according to a packet type, the aggregation data including:
aggregation data for Ethernet including a source MAC address, a destination MAC address, an E-frame type number, an average throughput, and a total number of received packets for each packet flow;
aggregation data for IP including a source MAC address, a destination MAC address, a source IP address, a destination IP address, an IP header protocol number, an average throughput, and a total number of received packets for each packet flow;

aggregation data for IGMP including a source MAC address, a destination MAC address, a source IP address, a destination IP address, an average throughput, a total number of received packets, a reception time, and a predetermined byte of IGMP payload from the beginning for each packet flow;

aggregation data for TCP or UDP including a source MAC address, a destination MAC address, a source IP address, a destination IP address, a source L4-port number, a destination L4-port number, an average throughput, and a total number of received packets for each packet flow;

aggregation data for PTP including a source MAC address, a destination MAC address, a source IP address, a destination IP address, a source L4-port number, a destination L4-port number, an average throughput, a total number of received packets, a transmission delay, a reception time, and an entire part of PTP header and payload for each packet flow; and aggregation data for RTP including a source MAC address, a destination MAC address, a source IP address, a destination IP address, a source L4-port number, a destination L4-port number, an average throughput, a total number of received packets, an RTP payload type number, an RTP SSRC identifier, a number of packets with an RTP marker bit value of 1, a packet reception interval, a number of packet losses, and a maximum number of burst losses for each packet flow.

6. The packet flow monitoring device according to claim 3, wherein the packet data extraction computer is further programmed to determine whether a marker bit in an RTP header is 1 when extracting the predetermined pieces of information from the replicated passing packet related to RTP, and extract the predetermined pieces of information so as to include 40 bytes of an RTP payload from the beginning when the marker bit is 1, the extraction data aggregation computer is further programmed to:

determine whether each of the replicated passing packets related to RTP complies with a Society of Motion Picture and Television Engineers (SMPTE) protocol of ST 2110-20, ST 2110-30, or ST 2022-6 from the 40 bytes of the RTP payload from the beginning on the basis of predetermined determination information when aggregating, for each packet flow, the predetermined pieces of information in each of the replicated passing packets related to RTP included in the extraction data report packet; and acquire predetermined information characterized in ST 2110-20, ST 2110-30, or ST 2022-6 from the 40 bytes of the payload from the beginning and add the predetermined information to the aggregation data when the replicated passing packet complies with ST 2110-20, ST 2110-30, or ST 2022-6 and the marker bit is 1.

7. The packet flow monitoring device according to claim 1, wherein the packet data extraction computer is further programmed to:

compress extraction data to be stored in the same extraction data report packet received in the same packet flow when extracting the predetermined pieces of information from the replicated passing packet to create extraction data; and insert the compressed data, a data compression presence/absence flag indicating presence/absence of data compression, and a data compression position flag indicating a data position of data compression to generate and output the extraction data report packet, and the extraction data aggregation computer is further programmed to restore the compressed data by referring to the data compression presence/absence flag and the data compression position flag.

* * * * *